US00RE36591E

United States Patent [19]

Hayashi et al.

[11] E Patent Number: Re. 36,591

[45] Reissued Date of Patent: Feb. 29, 2000

[54] TRANSMISSION DIVERSITY FOR A CDMA/TDD MOBILE TELECOMMUNICATION SYSTEM

[75] Inventors: Masaki Hayashi, Yokohama; Kazuyuki Miya, Machida; Osamu Kato, Yokohama, all of Japan

[73] Assignee: Matsushita Electric Industrial Co., Ltd., Osaka, Japan

[21] Appl. No.: 09/231,111

[22] Filed: Jan. 14, 1999

Related U.S. Patent Documents

Reissue of:

[64] Patent No.: 5,598,404
Issued: Jan. 28, 1997
Appl. No.: 08/388,416
Filed: Feb. 14, 1995

[30] Foreign Application Priority Data

Feb. 16, 1994 [JP] Japan ..... 6-019365
Sep. 6, 1994 [JP] Japan ..... 6-212434

[51] Int. Cl.[7] ..... H04J 13/04; H04J 3/00; H04B 7/216

[52] U.S. Cl. ..... 370/342; 370/280; 375/267; 375/299; 455/562; 455/101

[58] Field of Search ..... 370/335, 342, 370/280, 334, 320; 375/200, 207, 267, 299, 347, 349; 455/504–6, 562, 101

[56] References Cited

U.S. PATENT DOCUMENTS

| | | | |
|---|---|---|---|
| 4,041,397 | 8/1977 | Bauer et al. | 325/304 |
| 4,686,655 | 8/1987 | Hyatt | 367/59 |
| 5,022,046 | 6/1991 | Morrow, Jr. | 375/205 |
| 5,103,461 | 4/1992 | Tymes | 375/205 |
| 5,164,958 | 11/1992 | Omura | 375/205 |
| 5,212,830 | 5/1993 | Miller | 455/33.1 |
| 5,459,873 | 10/1995 | Moore et al. | 455/277.1 |

FOREIGN PATENT DOCUMENTS

| | | | |
|---|---|---|---|
| 582323-A1 | 2/1994 | European Pat. Off. | H04B 7/04 |
| WO92/10890 | 6/1992 | WIPO . | |
| WO95/06365 | 3/1995 | WIPO . | |

OTHER PUBLICATIONS

Riaz Esmailzadeh et al, "Power Control in Packet Switched Time Division Duplex Direct Sequence Spread Spectrum Communications", IEEE, 1992, pp. 989–992.

Nobuo Nakajima, "Micro/Pico Cellular Telecommunication and Network Architecture", *The 6th Karuizawa Workshop on Circuits and Systems*, Apr. 19–20, pp. 121–126.

43rd IEEE Vehicular Technology Conference, May 1993, pp. 602–606, "Linear Predictive Transmitter Diversity for Microcellular TDMA/TDD Mobile Radio System", Y. Kondo et al.

IEEE International Conference on Communications '93, vol. 3, May 1993, pp. 1775–179, "Diversity for the Direct–sequence Spread Spectrum System Using Multiple Transmit Antennas", V. Weerackody.

Raymond Steele (Ed.), "Mobile Radio Communications", Pentech Press (1992), pp. 70–77.

*Primary Examiner*—Dang Ton
*Assistant Examiner*—David Vincent
*Attorney, Agent, or Firm*—Venable; Robert J. Frank; Allen Wood

[57] ABSTRACT

In a base station which has a plurality of antennas, each of a plurality of comparison circuits operates to compare correlation levels, which are obtained by despreading received signals for a plurality of channels, with each other with respect to the antennas. Each of a plurality of transmission antenna selecting circuits operates to determine from which antenna a transmission signal is to be transmitted for every channel. Each of a plurality of multiplexing circuits operates to multiplex the transmission signals of the individual channels, which are spread, for every antenna. As a result, on the basis of the result of the comparison of the correlation levels with respect to the antennas, a transmission antenna is selected for every channel, and the signals of the channels that are to be transmitted by a given antenna are multiplexed, whereby the base station achieves transmission diversity.

44 Claims, 15 Drawing Sheets

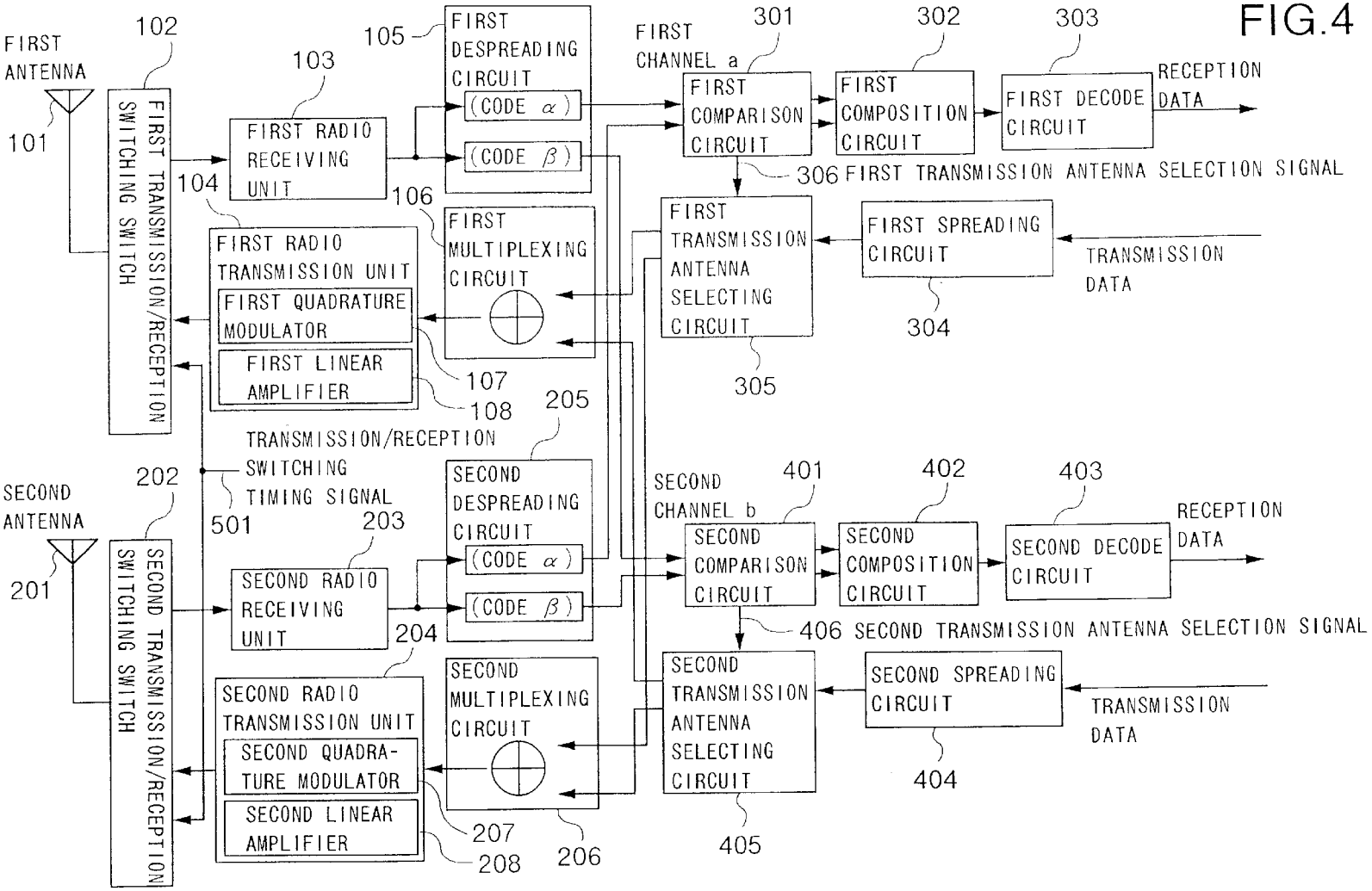
FIG.4
FIRST ANTENNA
101
FIRST TRANSMISSION/RECEPTION SWITCHING SWITCH
102
FIRST RADIO RECEIVING UNIT
103
FIRST RADIO TRANSMISSION UNIT
104
FIRST DESPREADING CIRCUIT
105
(CODE α)
(CODE β)
FIRST MULTIPLEXING CIRCUIT
106
FIRST QUADRATURE MODULATOR
107
FIRST LINEAR AMPLIFIER
108
FIRST CHANNEL a
FIRST COMPARISON CIRCUIT
301
FIRST COMPOSITION CIRCUIT
302
FIRST DECODE CIRCUIT
303
RECEPTION DATA
FIRST TRANSMISSION ANTENNA SELECTION SIGNAL
306
FIRST TRANSMISSION ANTENNA SELECTING CIRCUIT
305
FIRST SPREADING CIRCUIT
304
TRANSMISSION DATA
TRANSMISSION/RECEPTION SWITCHING TIMING SIGNAL
501
SECOND ANTENNA
201
SECOND TRANSMISSION/RECEPTION SWITCHING SWITCH
202
SECOND RADIO RECEIVING UNIT
203
SECOND RADIO TRANSMISSION UNIT
204
SECOND DESPREADING CIRCUIT
205
(CODE α)
(CODE β)
SECOND MULTIPLEXING CIRCUIT
206
SECOND QUADRATURE MODULATOR
207
SECOND LINEAR AMPLIFIER
208
SECOND CHANNEL b
SECOND COMPARISON CIRCUIT
401
SECOND COMPOSITION CIRCUIT
402
SECOND DECODE CIRCUIT
403
RECEPTION DATA
SECOND TRANSMISSION ANTENNA SELECTION SIGNAL
406
SECOND TRANSMISSION ANTENNA SELECTING CIRCUIT
405
SECOND SPREADING CIRCUIT
404
TRANSMISSION DATA

FIG.5

| TIME | t0 | t1 | t2 | t3 | t4 | t5 |
|---|---|---|---|---|---|---|
| ANTENNA A | RX | TX | RX | TX | RX | TX |
| ANTENNA B | RX | TX | RX | TX | RX | TX |
| | RECEIVED POWER | SELECTED ANTENNA | RECEIVED POWER | SELECTED ANTENNA | RECEIVED POWER | SELECTED ANTENNA |
| CHANNEL 1 A | 12 | A | 14 | A | 16 | A |
| CHANNEL 1 B | 10 | | 11 | | 12 | |
| CHANNEL 2 A | 12 | B | 15 | B | 18 | A |
| CHANNEL 2 B | 20 | | 16 | | 14 | |
| CHANNEL 3 A | 30 | A | 30 | A | 30 | A |
| CHANNEL 3 B | 12 | | 12 | | 15 | |
| CHANNEL 4 A | 24 | B | 25 | B | 26 | A |
| CHANNEL 4 B | 30 | | 28 | | 25 | |
| ANTENNA A | | CHANNEL 1,3 | | CHANNEL 1,3 | | CHANNEL 1,2,3,4 |
| ANTENNA B | | CHANNEL 2,4 | | CHANNEL 2,4 | | CHANNEL |

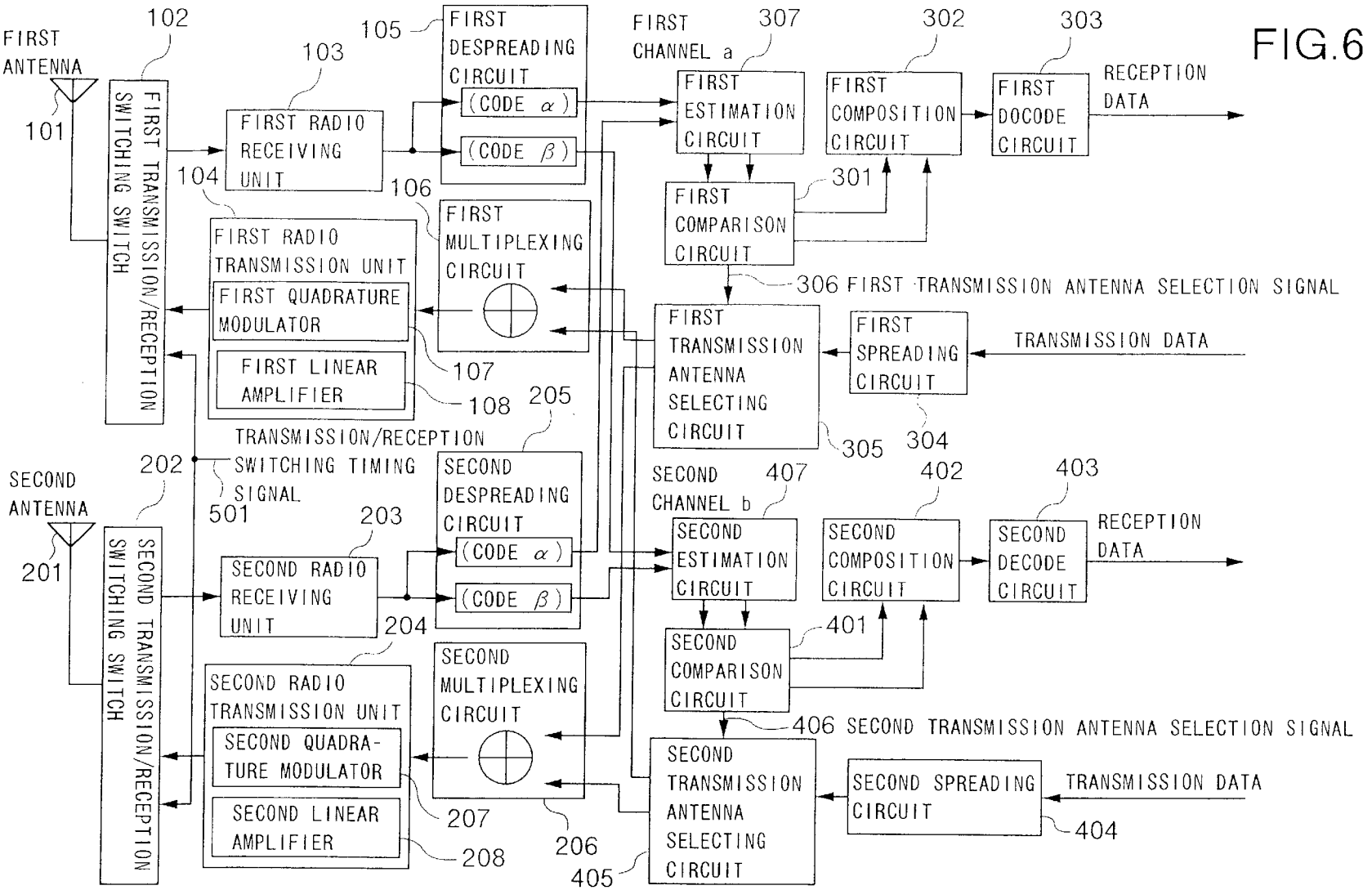
FIG.6
FIRST TRANSMISSION ANTENNA SELECTION SIGNAL
SECOND TRANSMISSION ANTENNA SELECTION SIGNAL
RECEPTION DATA
TRANSMISSION DATA
FIRST DECODE CIRCUIT
FIRST COMPOSITION CIRCUIT
FIRST SPREADING CIRCUIT
SECOND DECODE CIRCUIT
SECOND COMPOSITION CIRCUIT
SECOND SPREADING CIRCUIT
FIRST CHANNEL a
FIRST ESTIMATION CIRCUIT
FIRST COMPARISON CIRCUIT
FIRST TRANSMISSION ANTENNA SELECTING CIRCUIT
SECOND CHANNEL b
SECOND ESTIMATION CIRCUIT
SECOND COMPARISON CIRCUIT
SECOND TRANSMISSION ANTENNA SELECTING CIRCUIT
FIRST DESPREADING CIRCUIT
(CODE α)
(CODE β)
FIRST MULTIPLEXING CIRCUIT
SECOND DESPREADING CIRCUIT
SECOND MULTIPLEXING CIRCUIT
FIRST RADIO RECEIVING UNIT
FIRST RADIO TRANSMISSION UNIT
FIRST QUADRATURE MODULATOR
FIRST LINEAR AMPLIFIER
TRANSMISSION/RECEPTION SWITCHING TIMING SIGNAL
SECOND RADIO RECEIVING UNIT
SECOND RADIO TRANSMISSION UNIT
SECOND QUADRA-TURE MODULATOR
SECOND LINEAR AMPLIFIER
FIRST TRANSMISSION/RECEPTION SWITCHING SWITCH
SECOND TRANSMISSION/RECEPTION SWITCHING SWITCH
FIRST ANTENNA
SECOND ANTENNA
101
102
103
104
105
106
107
108
201
202
203
204
205
206
207
208
301
302
303
304
305
306
307
401
402
403
404
405
406
407
501

FIG.7

| TIME | t0 | t1 | | t2 | t3 | | t4 | t5 | |
|---|---|---|---|---|---|---|---|---|---|
| ANTENNA A | RX | TX | | RX | TX | | RX | TX | |
| ANTENNA B | RX | TX | | RX | TX | | RX | TX | |
| | RECEIVED POWER | ESTI-MATED VALUE | SELEC-TED ANTENNA | RECEIVED POWER | ESTI-MATED VALUE | SELEC-TED ANTENNA | RECEIVED POWER | ESTI-MATED VALUE | SELEC-TED ANTENNA |
| CHANNEL 1 A | 12 | 13 | A | 14 | 15 | A | 16 | 17 | A |
| CHANNEL 1 B | 10 | 10 | | 11 | 11 | | 12 | 12 | |
| CHANNEL 2 A | 12 | 14 | B | 15 | 16 | A | 18 | 19 | A |
| CHANNEL 2 B | 20 | 18 | | 16 | 15 | | 14 | 13 | |
| CHANNEL 3 A | 30 | 26 | A | 30 | 30 | A | 30 | 30 | A |
| CHANNEL 3 B | 12 | 15 | | 12 | 12 | | 15 | 17 | |
| CHANNEL 4 A | 24 | 26 | B | 25 | 26 | B | 26 | 27 | A |
| CHANNEL 4 B | 30 | 31 | | 28 | 27 | | 25 | 24 | |
| ANTENNA A | | CHANNEL 1,3 | | | CHANNEL 1,2,3 | | | CHANNEL 1,2,3,4 | |
| ANTENNA B | | CHANNEL 2,4 | | | CHANNEL 4 | | | | |

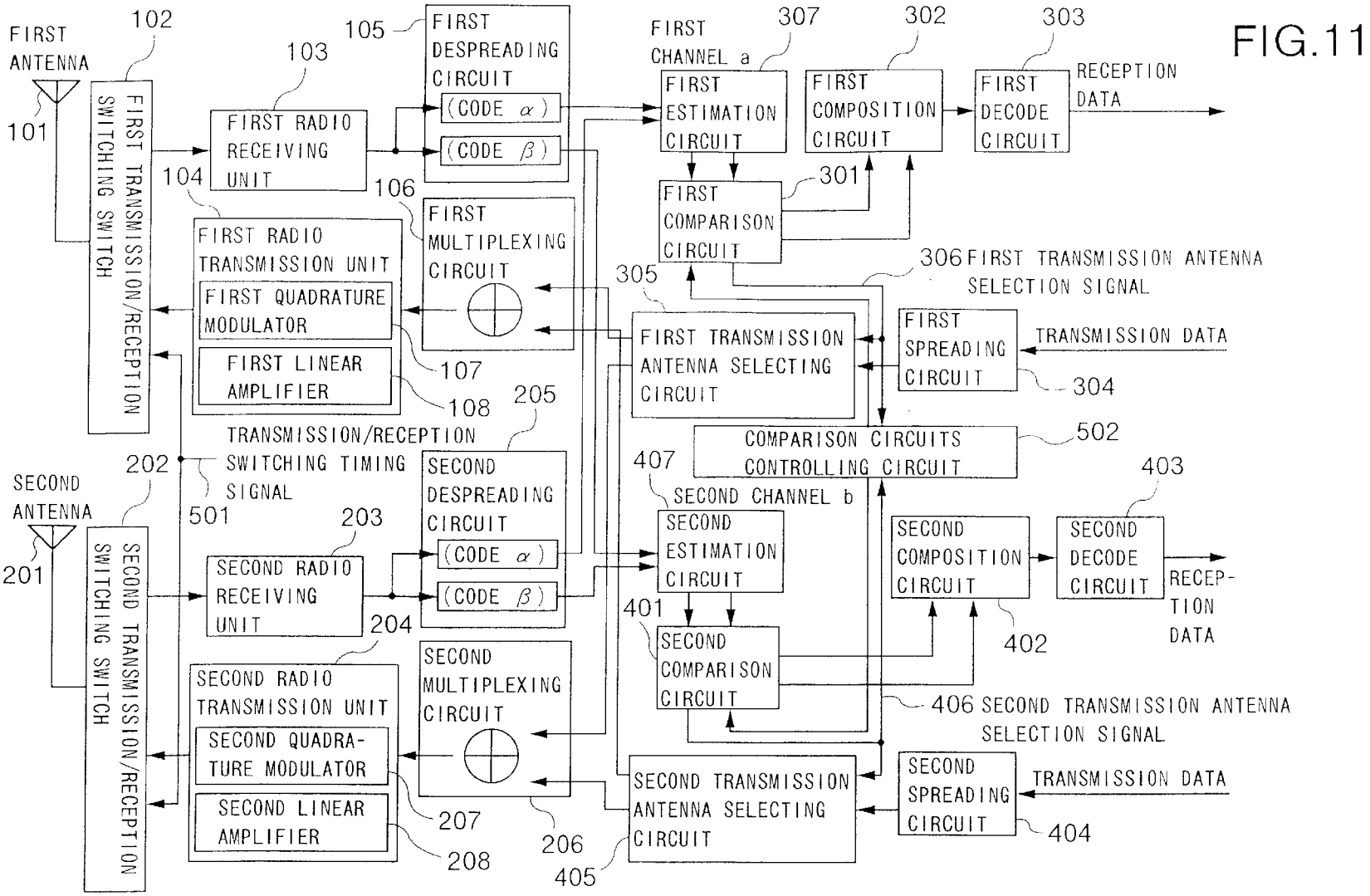
FIG. 11
RECEPTION DATA
FIRST DECODE CIRCUIT
303
FIRST COMPOSITION CIRCUIT
302
FIRST CHANNEL a
307
FIRST ESTIMATION CIRCUIT
FIRST COMPARISON CIRCUIT
301
306 FIRST TRANSMISSION ANTENNA SELECTION SIGNAL
TRANSMISSION DATA
304
FIRST SPREADING CIRCUIT
FIRST TRANSMISSION ANTENNA SELECTING CIRCUIT
305
502
COMPARISON CIRCUITS CONTROLLING CIRCUIT
SECOND CHANNEL b
407
SECOND ESTIMATION CIRCUIT
401
SECOND COMPARISON CIRCUIT
402
SECOND COMPOSITION CIRCUIT
403
SECOND DECODE CIRCUIT
RECEPTION DATA
406 SECOND TRANSMISSION ANTENNA SELECTION SIGNAL
TRANSMISSION DATA
404
SECOND SPREADING CIRCUIT
SECOND TRANSMISSION ANTENNA SELECTING CIRCUIT
405
FIRST DESPREADING CIRCUIT
(CODE α)
(CODE β)
105
FIRST MULTIPLEXING CIRCUIT
106
107
108
205
SECOND DESPREADING CIRCUIT
(CODE α)
(CODE β)
SECOND MULTIPLEXING CIRCUIT
206
207
208
103
FIRST RADIO RECEIVING UNIT
104
FIRST RADIO TRANSMISSION UNIT
FIRST QUADRATURE MODULATOR
FIRST LINEAR AMPLIFIER
TRANSMISSION/RECEPTION SWITCHING TIMING SIGNAL
501
203
SECOND RADIO RECEIVING UNIT
204
SECOND RADIO TRANSMISSION UNIT
SECOND QUADRATURE MODULATOR
SECOND LINEAR AMPLIFIER
102
FIRST TRANSMISSION/RECEPTION SWITCHING SWITCH
202
SECOND TRANSMISSION/RECEPTION SWITCHING SWITCH
FIRST ANTENNA
101
SECOND ANTENNA
201

FIG.13

| TIME | | t0 | t1 | | t2 | t3 | | t4 | t5 | |
|---|---|---|---|---|---|---|---|---|---|---|
| ANTENNA A | | RX | TX | | RX | TX | | RX | TX | |
| ANTENNA B | | RX | TX | | RX | TX | | RX | TX | |
| | | RECEIVED POWER | ESTI-MATED VALUE | SELEC-TED ANTENNA | RECEIVED POWER | ESTI-MATED VALUE | SELEC-TED ANTENNA | RECEIVED POWER | ESTI-MATED VALUE | SELEC-TED ANTENNA |
| CHANNEL 1 | A | 12 | 13 | A | 14 | 15 | A | 16 | 17 | A |
| | B | 10 | 10 | | 11 | 11 | | 12 | 12 | |
| CHANNEL 2 | A | 12 | 14 | B | 15 | 16 | A | 18 | 19 | A |
| | B | 20 | 18 | | 16 | 15 | | 14 | 13 | |
| CHANNEL 3 | A | 30 | 26 | A | 30 | 30 | A | 30 | 30 | A |
| | B | 12 | 15 | | 12 | 12 | | 15 | 17 | |
| CHANNEL 4 | A | 24 | 26 | B | 25 | 26 | B | 26 | 27 | B |
| | B | 30 | 31 | | 28 | 27 | | 25 | 24 | |
| ANTENNA A | | | CHANNEL 1,3 | | | CHANNEL 1,2,3 | | | CHANNEL 1,2,3 | |
| ANTENNA B | | | CHANNEL 2,4 | | | CHANNEL 4 | | | CHANNEL 4 | |

FIG.15

| TIME | | t0 | t1 | | t2 | t3 | | t4 | t5 | |
|---|---|---|---|---|---|---|---|---|---|---|
| ANTENNA A | | RX | TX | | RX | TX | | RX | TX | |
| ANTENNA B | | RX | TX | | RX | TX | | RX | TX | |
| | | RECEIVED POWER | ESTI-MATED VALUE | SELEC-TED ANTENNA | RECEIVED POWER | ESTI-MATED VALUE | SELEC-TED ANTENNA | RECEIVED POWER | ESTI-MATED VALUE | SELEC-TED ANTENNA |
| CHANNEL 1 | A | 12 | 13 | A | 14 | 15 | A | 16 | 17 | A |
| | B | 10 | 10 | | 11 | 11 | | 12 | 12 | |
| CHANNEL 2 | A | 12 | 14 | B | 15 | 16 | B | 18 | 19 | A |
| | B | 20 | 18 | | 16 | 15 | | 14 | 13 | |
| CHANNEL 3 | A | 30 | 26 | A | 30 | 30 | A | 30 | 30 | B |
| | B | 12 | 15 | | 12 | 12 | | 15 | 17 | |
| CHANNEL 4 | A | 24 | 26 | B | 25 | 26 | B | 26 | 27 | B |
| | B | 30 | 31 | | 28 | 27 | | 25 | 24 | |
| ANTENNA A | | | CHANNEL 1,3 | | | CHANNEL 1,3 | | | CHANNEL 1,2 | |
| ANTENNA B | | | CHANNEL 2,4 | | | CHANNEL 2,4 | | | CHANNEL 3,4 | |

TRANSMISSION DIVERSITY FOR A CDMA/TDD MOBILE TELECOMMUNICATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a mobile telecommunication system which is adapted to secure a communication link for a mobile unit moving in a wide area by utilizing wireless communications, and more particularly to a mobile telecommunication system which is adapted to perform communication by utilizing a CDMA/TDD system adopting the direct sequence spread spectrum (DS-SS) system.

2. Description of the Related Art

A system in which communication is established among a plurality of stations in the same frequency band is called a multiple access system. CDMA (Code Division Multiple Access) is a technology in which the multiple access is performed on the basis of spread spectrum communication, in which an information signal is transmitted with the spectrum thereof spread into a sufficiently wider band than the band width of the information signal of the unit. A DS-SS system is a system wherein in the spreading, the information signal is directly multiplied by a spreading code. TDD (Time Division Duplex) means a system wherein the transmission/reception of the signal is performed in the same band and is also called a ping pong system, i.e., it means a system wherein the communication is performed with the same radio frequency subjected to time division in the transmission/reception. As for the advantages of the TDD system, as shown in a paper entitled "Micro/Pico Cellular Telecommunication and Network Architecture" (N. Nakajima: the 6-th Karuizawa Workshop on Circuits and Systems (Apr. 19 to 20, 1993) pp. 121 to 126), it is well known that since transmission diversity can be applied to the base station, space diversity becomes unnecessary in the mobile radio telephone, and as a result, miniaturization can be realized.

The received radio wave via the mobile propagation path is subjected to fluctuation called fading. This becomes a degradation factor of the transmission system. In order to realize high quality communication, as for the technology for reducing the influence of the above-mentioned fading, diversity reception utilizing two or more received radio waves is well known. Space diversity is one of the above-mentioned diversity technologies in which, by using two or more sufficiently spaced apart receiving antennas, a plurality of fading received radio waves are obtained which change independently of one another.

On the other hand, transmission diversity means a technology wherein from the received radio waves received via space diversity, the conditions of the path from the mobile station to the respective antennas of the base station are estimated, and transmission is performed in turn from the antenna having the better transmission path or link state. In the case of the TDD system, since the system of interest is a system wherein the transmission/reception is performed in the same band, the frequency correlation of the fading fluctuation of the transmitted radio wave is the same as that of the received radio wave. Therefore, if the interval of time required for the transmitted radio wave and the received radio wave to be switched to each other is sufficiently short, since the mutual time correlation of the fading fluctuation is high, by the application of the above-mentioned transmission diversity, a reduction of the influence by the fading fluctuation of the transmitted radio wave can be relatively readily promoted. As a result, for the individual channels, high transmission link quality can be realized.

Heretofore, the application of transmission diversity in a base station adopting the TDD system has been considered in a TDMA/TDD system. TDMA (Time Division Multiple Access) is a system wherein the radio frequency is subjected to time division, and a specific time slot is assigned to a user, and in the time slot thus assigned, the communication is performed.

The TDMA/TDD system is employed in a PHS (Personal Handy phone System) as the Japanese next generation digital codeless telephone system as well as in a DECT system which is in development in Europe. FIG. 1 shows an example in which in the PHS system, a base station BS is provided with two transmission/reception antennas A and B, and communication is established between the base station BS and four mobile terminals PS1 to PS4. The PHS system has a frame structure as shown in FIG. 2 for example. In this connection, with 5 msec (transmission 2.5 msec/reception 2.5 msec) as one frame, four channels are subjected to time division multiplexing. Each subframe, in the figure, for accommodating a signal of the associated channel is called a time slot, and the shadowed portions represent gard time intervals which are provided in order to prevent the transmitted signal and the received signal from colliding with each other due to a lag between the transmission timing and the receiving timing.

In addition, FIG. 3 is a view showing an example of a situation in which the base station BS, having the two antennas A and B as shown in FIG. 1, switches the transmission antenna every channel in accordance with the levels of the received signals. The transmission/reception frames and the time slots are shown. In FIG. 3, reference symbol TX represents transmission and reference symbol RX represents reception. Then, it is assumed that the four mobile terminals PS1 to PS4 perform their respective communications using the channels 1 to 4. In the base where at time t0, the levels of the received signals in the individual channels (the averages or the like of the reception levels between the time slots) have the relationship, as shown in the figure, with respect to the two antennas A and B (the relation of A>B represents that the reception level of the antenna A is higher than that of the antenna B), when at the next time t1, the transmission is performed, the antenna having the higher reception level is selected to transmit the signal. In the figure, the reference symbol of the selected antenna is shown. At time t1, it is shown that each of the channels 1 and 3 select the antenna A, and each of the channels 2 and 4 selects the antenna B. In the figure, a time slot for transmission is represented by a shadowed portion. In addition, a portion having no shadowing represents a time slot in which no transmission is performed. Similarly, at time t3, on the basis of the results (received power) at time t2, an antenna for transmission is selected every channel. In such a way, the above-mentioned transmission diversity can be realized.

As compared with such a TDMA system, the CDMA system is considered as a system wherein, when used in a cellular system, a higher frequency utilization efficiency than that in the TDMA system can be realized, and hence a larger number of users can be accommodated. Therefore, it is considered that in the future, the CDMA system will be applied to a large number of cellular systems. In addition, the TDD system is a system wherein the transmission/reception is performed in the same frequency band on the basis of time division, whereas as another communication system, there is well known an FDD (Frequency Division Duplex) system in which two frequency bands, which are sufficiently spaced apart from each other, are respectively assigned to transmission and reception. Heretofore, in the CDMA system, the CDMA/FDD system employing the FDD system has been mainly developed.

However, in the conventional communication apparatus adopting the CDMA/FDD system, there arise the following problems.

(1) Since the correlation between the fading of the forward link and that of the reverse link is small, the space diversity technique in the base station can be applied to only the reverse link.

(2) In the case where the received power is reduced due to frequency selective fading, the communication quality is degraded and hence it is difficult to perform high quality communication.

(3) In the case where the communication capacity has greatly increased, since the interference of the communication radio waves of other stations with the communication radio wave of the local station becomes large, the communication quality is degraded, and hence it is difficult to perform high quality communication.

(4) In the case where the communication capacity has greatly increased, the requirements on the quadrature modulator and the linear amplifier of the base station become severe.

SUMMARY OF THE INVENTION

The present invention was made in order to solve the above-mentioned problems associated with the prior art, and it is therefore an object of the present invention to provide a mobile telecommunication system which is capable of applying the space diversity technique to the forward link as well, and of stabilizing the received power, and of greatly reducing interference of the communication radio waves of other stations with the communication radio wave of the local station, and of reducing the specifications required for the modulator, the amplifier and the like.

In order to attain the above-mentioned object, according to the present invention, in a mobile telecommunication system, a base station includes: a plurality of antennas; means provided in each of the antennas for subjecting a received signal on a reverse link (transmission from a mobile terminal to the base station) to despreading every channel; means for comparing correlation levels, which are obtained by the despreading, with each other among the antennas for the channels; means for selecting an antenna, from which a transmission signal is to be transmitted, for every channel in transmission; and means for multiplexing the transmission signals of the individual channels, which are obtained by spreading, every antenna.

Therefore, according to the present invention, in the reverse link, an antenna by which an electric field having a good level is received is selected, whereby it is possible to maintain always a communication link in a good state. In addition, by increasing the number of antennas, even the request for the high communication quality can be satisfied. Further, since the correlation of the transmission path of the reverse link and that of the forward link is high, in the forward link as well, the same effects can be obtained.

In addition, since the transmission path or link states are different among the mobile stations, a transmission/reception antenna is selected for every link leading to the associated mobile station, whereby the interference due to the communication radio waves of other mobile stations is relatively reduced. As a result, since the communication quality is improved, and also the transmission power can be reduced, the mobile station can be miniaturized and lightened.

BRIEF DESCRIPTION OF THE DRAWINGS

FIG. 4 is a block diagram showing the configuration of a main portion of a base station of a mobile telecommunication system according to a first embodiment of the present invention;

FIG. 5 is a schematic view showing an example of the base station transmission diversity of the mobile unit communication system in the first embodiment;

FIG. 6 is a block diagram showing the configuration of a main portion of a base station of a mobile telecommunication system according to a second embodiment of the present invention;

FIG. 7 is a schematic view showing an example of the base station transmission diversity of the mobile telecommunication system in the second embodiment;

FIG. 11 is a schematic view showing an arrangement of antennas of a base station of a mobile telecommunication system according to a sixth embodiment of the present invention;

FIG. 13 is a schematic view showing an example of the base station transmission diversity of a mobile telecommunication system according to a seventh embodiment of the present invention;

FIG. 15 is a schematic view showing an example of the base station transmission diversity of a mobile telecommunication system according to an eighth embodiment of the present invention.

DESCRIPTION OF THE PREFERRED EMBODIMENTS

First Embodiment

Figure 1:
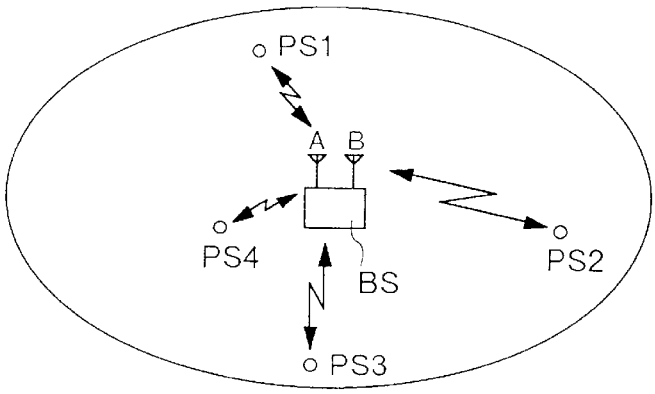
FIG.1 PRIOR ART
FIG. 1 is a schematic view showing an example of an arrangement of a base station and mobile terminal in a cellular radio communication system.
Figure 2:
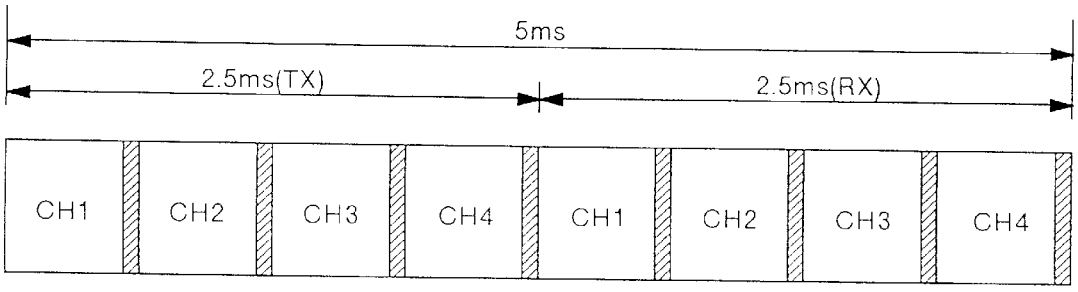
FIG.2 PRIOR ART
FIG. 2 is a schematic view showing the frame structure of the PHS system.

FIG. 4 shows the configuration of a base station of a mobile telecommunication system according to a first embodiment of the present invention, and in this example the base station has two antennas and two channels a and b. In FIG. 4, reference numeral 101 designates a first antenna (an antenna A), reference numeral 201 designated a second antenna (an antenna B), reference numeral 102 designates a first transmission/reception switching switch for the first antenna 101, reference numeral 202 designates a second transmission/reception switching switch for the second antenna 201, reference numeral 103 designates a first radio receiving unit for the first antenna 101, and reference numeral 203 designates a second radio receiving unit for the second antenna 201. Reference numeral 105 designates a first despreading circuit for the first antenna 101, and reference numeral 205 designates a second despreading circuit for the second antenna 201. Each of the first and second despreading circuits 105 and 205 operates to subject received data to despreading using both spreading codes $\alpha$ and $\beta$. Reference numeral 301 designates a first comparison circuit which operates to compare correlation levels (power levels of received signals), which have been obtained by the despreading in the first and second despreading circuits 105 and 205 using the spreading code $\alpha$, with each other with respect to a first channel a, and reference numeral 401 designates a second comparison circuit which operates to compare correlation levels, which have been obtained by the despreading in the first and second despreading circuits 105 and 205 using the spreading code $\beta$, with each other with respect to a second channel b. Reference numeral 302 designates a first composition circuit which operates to compose the received signals, which have been subjected to despreading in the first and second despreading circuits 105 and 205 using the spreading code $\alpha$, with respect to the first channel a, and reference numeral 402 designates a second composition circuit which operates to compose the received signals, which have been subjected to the despreading in the first and second despreading circuits 105 and 205 using the spreading code $\beta$, with respect to the second channel b. Reference numeral 303 designates a first decode circuit for the first channel a which operates to decode the composite signal which has been obtained by the composition in the first composition circuit 302, and reference numeral 403 designates a second decode circuit for the second channel b which operates to decode the composite signal which has been obtained by the composition in the second composition circuit 402.

Reference numeral 304 designates a first spreading circuit which operates to spreading transmission data of the first channel a using the spread code $\alpha$, reference numeral 404 designates a second spreading circuit which operates to spread transmission data of the second channel b using the spreading code $\beta$, reference numeral 305 designates a first transmission antenna selecting circuit for the first channel a which operates to select from which antenna the transmission signal, which has been spread in the first spreading circuit 304, is to be transmitted, and reference numeral 405 designates a second transmission antenna selecting circuit for the second channel b which operates to select from which antenna the transmission signal, which has been spread in the second spreading circuit 404, is to be transmitted. Reference numeral 106 designates a first multiplexing circuit which operates to multiplex the spread transmission signals with respect to the first antenna 101, reference numeral 206 designates a second multiplexing circuit which operates to multiplex the spread transmission signals with respect to the second antenna 201, and reference numeral 104 designates a first radio transmission unit for the first antenna 101 which has a first quadrature modulator 107 and a first linear amplifier 108. Reference numeral 204 designates a second radio transmission unit for the second antenna 201 which has a second quadrature modulator 207 and a second linear amplifier 208. In addition, reference numeral 501 designates a transmission/reception switching timing signal which is used to operate the first and second transmission/reception switching switches 102 and 202.

Next, the operation of the abovementioned first embodiment will be described.

The received signals which have been received by the first and second antennas 101 and 201, respectively, are subjected to first order demodulation in the first and second radio receiving units 103 and 203 after passing through the first and second transmission/reception switching switches 102 and 202, respectively. Then, after down-conversion and detection, the correlation of the first channel a and that of the second channel b are detected by each of the first and second despreading circuits 105 and 205. With respect to the correlation detection results which have been obtained from the two antennas 101 and 201 independently of each other, the frame mean powers of the correlation levels (the power levels of the received signals) are calculated for every channel in each of the first and second comparison circuits 301 and 401. On the basis of those results, the transmission path or link states (the transfer functions of the transmission links) of the first and second antennas 101 and 201 are obtained, and then it is determined from which of the first and second antennas 101 and 201 the signal of each channel is to be transmitted at the next transmission timing, and then, first and second transmission antenna selection signals 306 and 406 are respectively output. The received signals which have been passed through the first and second comparison circuits 301 and 401, respectively, are composed by the first and second composition circuits 302 and 402 to be decoded in the first and second decode circuits 303 and 403, thereby obtaining the reception data of the individual channels.

On the other hand, the transmission data of the first channel a and the transmission data of the second channel b (the signals after digital modulation) are respectively subjected to band spreading in the first and second spreading circuits 304 and 404 using the spreading codes $\alpha$ and $\beta$, which are assigned to the respective channels, and then are multiplexed with respect to the transmission antennas in the first and second multiplexing circuits 106 and 206 through the first and second transmission antenna selecting circuits 305 and 405, which have been switched by the first and second transmission antenna selection signals 306 and 406. The multiplexed signals are respectively up-converted in the first and second radio transmission units 104 and 204, and then are respectively transmitted outwardly from the first and second antennas 101 and 201 through the first and second transmission/reception switching switches 102 and 202, which are switched by the transmission/reception switching timing signal 501.

Figure 3:
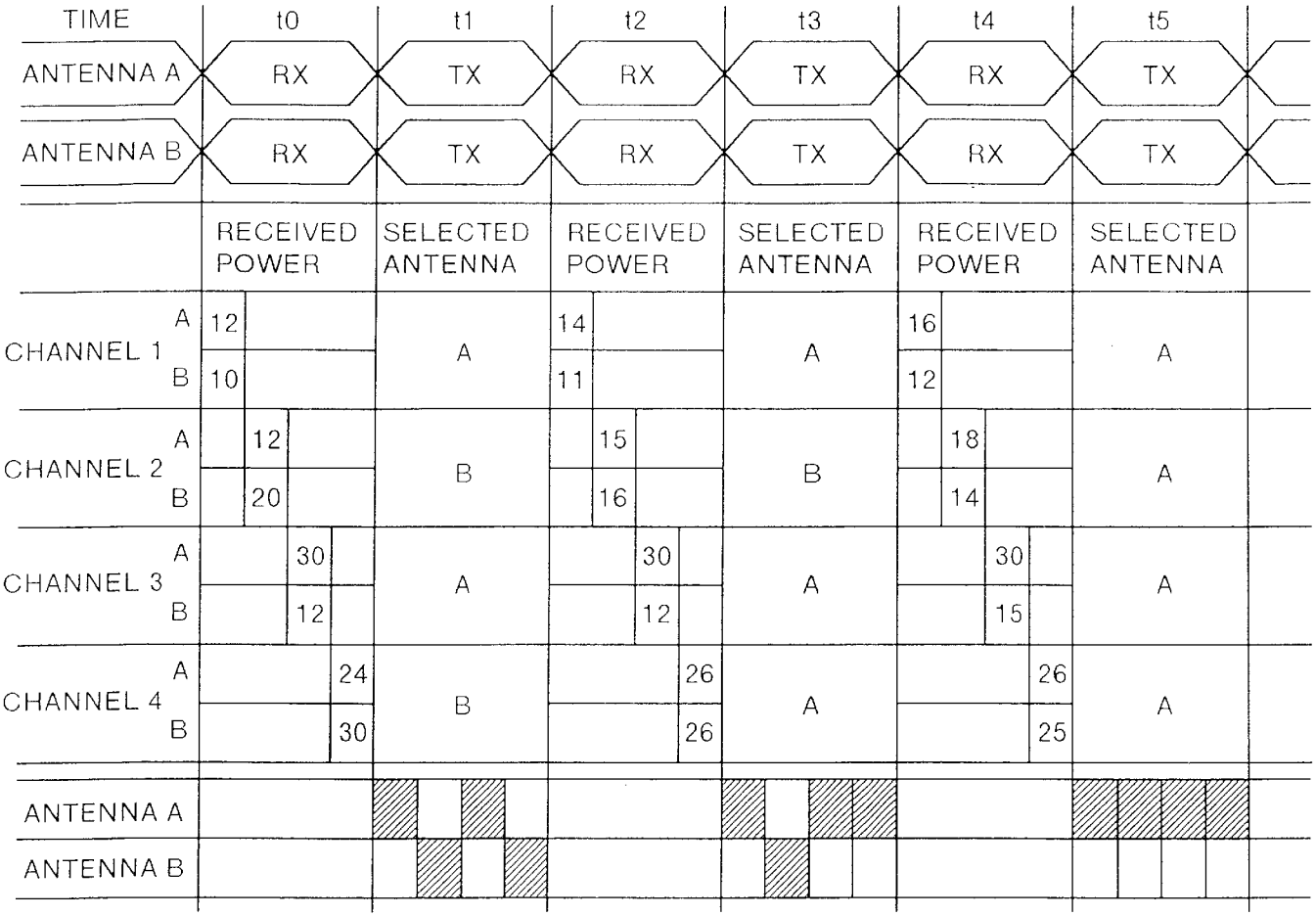
FIG.3 PRIOR ART
FIG. 3 is a schematic view showing an example of the base station transmission diversity in a conventional TDMA/TDD system.

FIG. 5 shows an example in which the CDMA/TDD system of the present embodiment, the base station including the two antennas A and B, switches the transmission antenna for every channel in accordance with the levels of the received signals. The transmission/reception frames are shown. In addition, FIG. 5 shows an example in the case where four channels are provided. Similarly to the TDMA/TDD system shown in FIG. 3, reference symbol TX represents transmission, and reference symbol RX represents reception, and it is assumed that the mobile terminals PS1 to PS4 (referring to FIG. 1) perform respective communications using channels 1 to 4. In the case where at time t0, the levels of the received signals of the individual channels (the averages or the like of the levels of the received signals for one frame) have the relationship, as shown in the figure, with respect to the antennas A and B, it is assumed that when the transmission is performed at the next time t1, the antenna having the higher reception level is selected to perform the transmission. In the figure, the reference symbol of the selected antenna is shown. Then it is shown that at time t1, each of the channels 1 and 3 selects the antenna A and each of the antennas 2 and 4 selects the antenna B, and after the signal of channel 1 and the signal of channel 3 have been multiplexed, the resultant signal is transmitted outwardly from the antenna A, and also after the signal of channel 2 and the signal of channel 4 have been multiplexed, the resultant signal is transmitted outwardly from the antenna B. At time t3 and time t5 as well, on the basis of the reception levels at time t2 and time t4, and antenna is selected for every channel and multiplexing is performed before transmission of the resultant signals.

As a result, in an environment in which fading changes depending on the frequency band and varies in terms of time, the power levels of the received signals of the reverse link and the forward link can be stabilized, and high quality communication can be realized.

Second Embodiment

FIG. 6 shows the configuration of a base station of a mobile telecommunication system according to a second embodiment of the present invention, and also shows an example in which the base station has two antennas and two channels a and b. In FIG. 6, reference numeral 101 designates a first antenna (an antenna A), reference numeral 201 designates a second antenna (an antenna B), reference numeral 102 designates a first transmission/reception switching switch for the first antenna 101, reference numeral 202 designates a second transmission/reception switching switch for the second antenna 201, reference numeral 103 designates a first radio receiving unit for the first antenna 101, and reference numeral 203 designates a second radio receiving unit for the second antenna 201. Reference numeral 105 designates a first despreading circuit for the first antenna 101, and reference numeral 205 designates a second despreading circuit for the second antenna 201. In this connection, each of the first and second despreading circuits 105 and 205 operates to subject received data to despreading using spreading codes α and β. Reference numeral 307 designates a first estimation circuit which operates to estimate future values from past values of the correlation levels (the power levels of received signals), of the first channel a, which have been obtained by the despreading in the first and second despreading circuits 105 and 205 using the spreading code α, and reference numeral 407 designates a second estimation circuit which operates to estimate future values from past values of the correlation levels, of the second channel b, which have been obtained by the despreading in the first and second despreading circuits 105 and 205 using the spreading code β. Reference numeral 301 designates a first comparison circuit for the first channel a which operates to compare the estimated values of the correlation levels, which have been obtained from the first estimation circuits 307, between the first and second antennas 101 and 201, reference numeral 401 designates a second comparison circuit for the second channel b which operates to compare the estimated values of the correlation levels, which have been obtained from the second estimation circuit 407, between the first and second antenna 101 and 201, reference numeral 302 designates a first composition circuit which operates to compose the received signals of the first channel a which have been obtained by the despreading in the first and second despreading circuits 105 and 205 using the spreading code α, reference numeral 402 designates a second composition circuit which operates to compose the received signals of the second channel b which have been obtained by the despreading in the first and second despreading circuits 105 and 205 using the spreading code β, reference numeral 303 designates a first decode circuit for the first channel a which operates to decode the composite signal which has been obtained by composing the received signals in the first composition circuit 302, and reference numeral 403 designates a second decode circuit for the channel b which operates to decode the composite signal which has been obtained by composing the received signals in the second composition circuit 402.

Reference numeral 304 designates a first spreading circuit which operates to spread transmission data of the first channel using the spreading code α, reference numeral 404 designates a second spreading circuit which operates to spread transmission data of the second channel b using the spreading code β, reference numeral 305 designates a first transmission antenna selecting circuit for the first channel a which operates to determine from which antenna the transmission signal, which has been obtained by spreading in the first spreading circuit 304, is to be transmitted, and reference numeral 405 designates a second transmission antenna selecting circuit for the second channel b which operates to determine from which antenna the transmission signal, which has been obtained by spreading in the second spreading circuit 404, is to be transmitted. Reference numeral 106 designates a first multiplexing circuit which operates to multiplex the spread transmission signals with respect to the first antenna 101, reference numeral 206 designates a second multiplexing circuit which operates to multiplex the spread transmission signals with respect to the second antenna 201, and reference numeral 104 designates a first radio transmission unit for the first antenna 101 which has a first quadrature modulator 107 and a first linear amplifier 108. Reference numeral 204 designates a second radio transmission unit for the second antenna 201 which has a second quadrature modulator 207 and a second linear amplifier 208. In addition, reference numeral 501 designates a transmission/reception switching timing signal which is used to operate the first and second transmission/reception switching switches 102 and 203.

Next, the operation of the abovementioned second embodiment will be described.

The received signals which have been received by the first and second antennas 101 and 201, respectively, are subjected to first order demodulation in the first and second radio receiving units 103 and 203 after passing through the first and second transmission/reception switching switches 102 and 202. Then, after down-conversion and detection, the correlations of the first and second channels a and b are detected by each of the first and second despreading circuits 105 and 205. With respect to the correlation detection results which have been obtained from the two antennas 101 and 201 independently of each other, the frame mean powers of the correlation levels (the power levels of the received signals) are calculated every channel in the first and second estimation circuits 307 and 407. On the basis of those results, the transmission link states (the transfer functions of the transmission links) of the first and second antennas 101 and 201 are obtained to estimate the future values from the past values, and the estimated future values are compared with each other by each of the first and second comparison circuits 301 and 401. Then it is determined from which of the first and second antennas 101 and 201 the signal of each channel is to be transmitted outwardly at the next transmission timing, and then first and second transmission antenna selection signals 306 and 406 are respectively output. The received signals which have been passed through the first and second comparison circuits 301 and 401, respectively, are composed in the first and second composition circuits 302 and 402 to be decoded in the first and second decode circuits 303 and 403 of the respective channels, thereby obtaining the reception data of the individual channels.

On the other hand, the transmission data of the first channel a and the transmission data of the second channel b (the signals after digital modulation) are respectively subjected to band spreading in the first and second spreading circuits 304 and 404 using the spreading codes $\alpha$ and $\beta$, which are assigned to the respective channels, and then are multiplexed with respect to the transmission antennas in the first and second multiplexing circuits 106 and 206 through the first and second transmission antenna selecting circuits 305 and 405, which are switched by the first and second transmission antenna selection signals 306 and 406. The multiplexed signals are respectively up-converted in the first and second radio transmission units 104 and 204, and then are respectively transmitted outwardly from the first and second antennas 101 and 201 through the first and second transmission/reception switching switches 102 and 202, which are switched by the transmission/reception switching timing signal 501.

FIG. 7 shows an example in which the CDMA/TDD system of the present embodiment, the base station including the two antennas A and B, switches the transmission antenna for every channel in accordance with the levels of the received signals. The transmission/reception frames are shown. In addition, FIG. 7 shows an example in the case where four channels are provided. Similarly to FIG. 5, reference symbol TX represents transmission, and reference symbol RX represents reception, and it is assumed that the mobile terminals PS1 to PS4 (referring to FIG. 1) perform the respective communication using the channels 1 to 4. In the case where at time t0, the levels of the received signals of the individual channels (the averages or the like of the levels of the received signals for one frame) have the relationship, as shown in FIG. 7, with respect to the antennas A and B, and are estimated at time t1, as shown in FIG. 7, it is assumed that when at the next time t1, the transmission is performed, the antenna having the higher estimated value of the reception level is selected to perform the transmission. In the figure, the reference symbol of the selected antenna is shown. Then, it is shown that at time t1, each of the channels 1 and 3 selects the antenna A and each of the channels 2 and 4 selects the antenna B, and after the signal of channel 1 and the signal of channel 3 have been multiplexed, the resultant signal is transmitted outwardly from the antenna A, and also after the signal of channel 2 and the signal of channel 4 have been multiplexed, the resultant signal is transmitted outwardly from the antennas B. At time t3 as well, on the basis of the reception levels at time t2 and the reception levels prior thereto, the transmission link states at time t3 are estimated, and a transmission antenna is selected for every channel and multiplexing is performed, and then the multiplexed signals are transmitted outwardly from the associated antennas. At time t5 as well, similarly, the above-mentioned processings will be executed.

As a result, in an environment in which fading changes depending on the frequency band and varies in terms of time, the states of the transmission links can be estimated and the power levels of the received signals of the reverse link and the forward link can be stabilized, and high quality communication can be realized.

Third Embodiment

Figure 8:
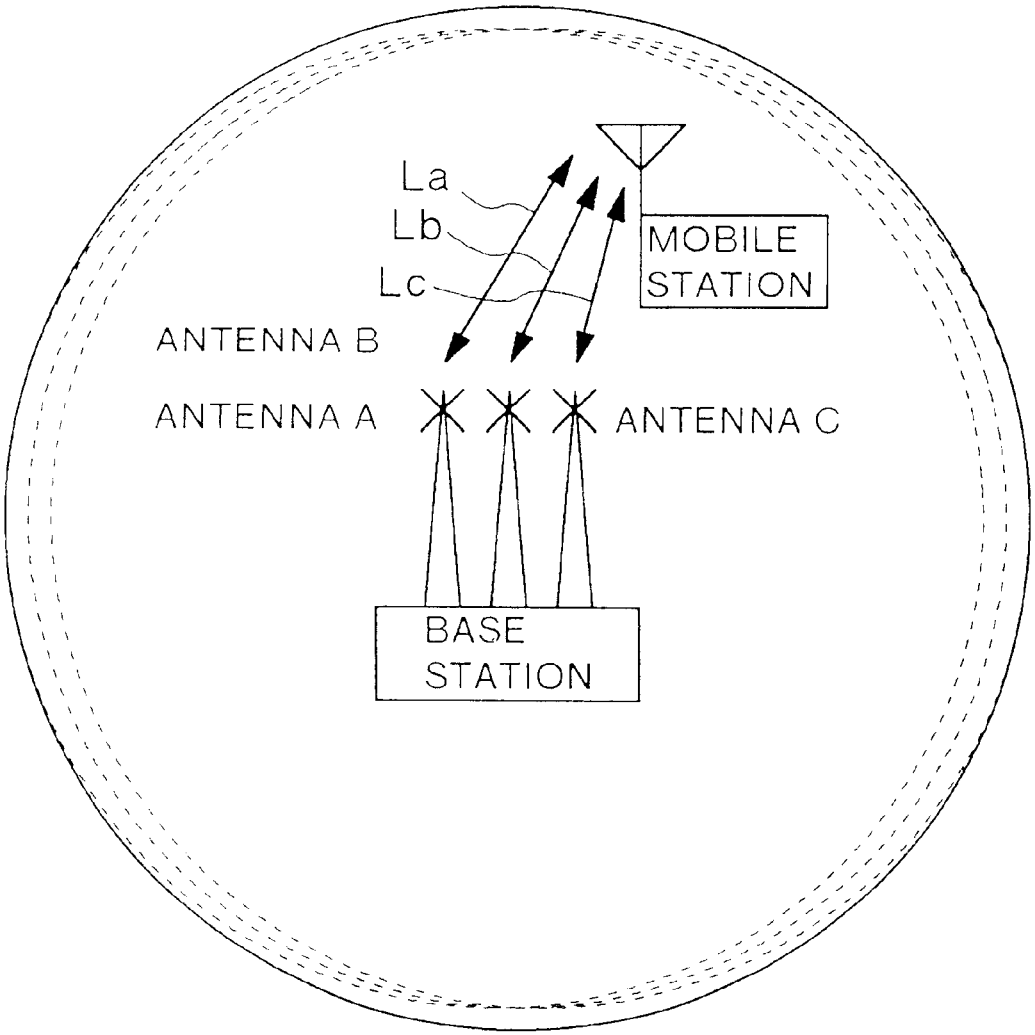
FIG. 8 is a schematic view showing an arrangement of antennas of a base station of a mobile telecommunication system according to a third embodiment of the present invention.

The configuration of a base station of a mobile telecommunication system according to the present embodiment is the same as that in the second embodiment. FIG. 8 shows an example of an antenna arrangement of the base station of the mobile telecommunication system in the present embodiment, and also shows an example in the case where three antennas A, B and C are provided. With respect to the antennas A, B and C, any two antennas are separated enough to obtain independently fading transmission links, and they are arranged in the central portion of the cover area of the base station to provide generally concentric coverage.

In mobile telecommunication, the fluctuations in the power level of the received signal are roughly due to the following three factors.

(1) Change caused by distance: Fluctuations in the reception level due to a change in the communication distance caused by movement of the mobile station.

(2) Change in central value: Fluctuations in the reception level due to a change in the environment, such as buildings.

(3) Instantaneous change: Fluctuations in the reception level due to frequency selective fading.

In the case where three antennas are arranged in a manner as shown in FIG. 8, the distances La, Lb and Lc between the mobile station and the three antennas A, B and C are not largely different from one another. In addition, since there is not a large difference even in the environment such as the communication links, and hence the instantaneous change becomes the predominant factor in the fluctuations in the reception level, for the long term average, there is no difference in the reception levels among the antennas. Therefore, even if the reception level of the antenna A drops instantaneously, the possibility is high that a higher reception level can be obtained by antenna B or C, and thus in an antenna of interest, good reception may be obtained. This is also applies to the case where the reception level of antenna B or C drops. Thus, the possibility is small that the reception levels of all of the three antennas drop. Therefore, if the antenna having the higher reception level is selected to perform the transmission/reception, communication at a high reception level can be always performed. In addition, by increasing the number of antennas, the possibility is reduced more and more that the reception levels of all of the antennas drop, and thus the fluctuation in the reception level after selection of the antenna becomes small.

The result is that the communication quality is remarkably improved on the reception side (in the reverse link of the base station) by stabilizing the transmission/reception level. That is, high quality communication in which the bit error rate is low in the reverse link becomes possible.

Fourth Embodiment

Figure 9:
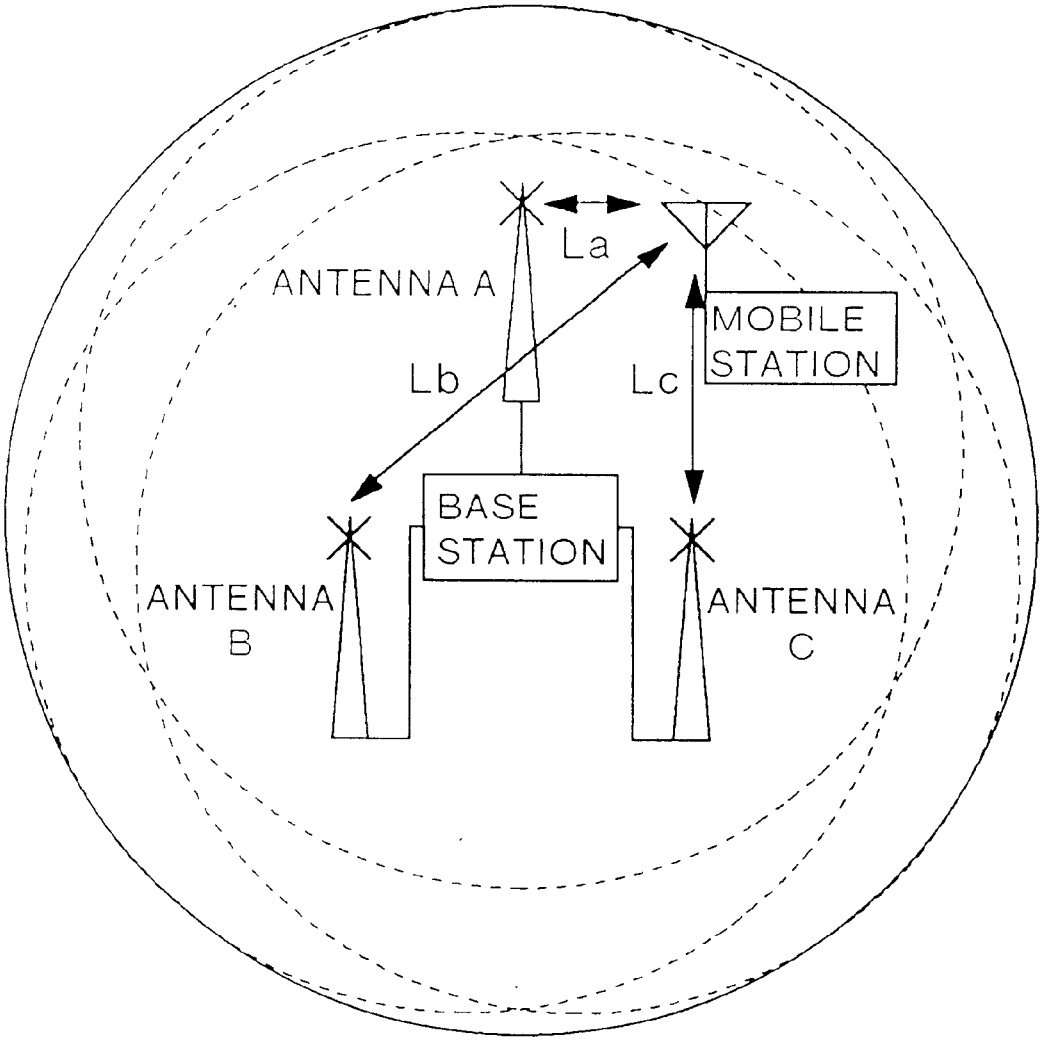
FIG. 9 is a schematic view showing an arrangement of antennas of a base station of a mobile telecommunication system according to a fourth embodiment of the present invention.

The configuration of a base station of a mobile telecommunication system according to the present embodiment is the same as that in the second embodiment. FIG. 9 shows an example of an antenna arrangement of the base station of the mobile telecommunication system in the present embodiment, and also shows an example in which three antennas A, B and C are employed. The three antennas A, B and C are distributively arranged in a plurality of locations within the cover area of the base station. With respect to the three antennas A, B and C, any two antennas are separated enough to obtain independently fading transmission links.

In the case where the three antennas A, B and C are arranged in a manner as shown in FIG. 9, since the distances La, Lb and Lc between the mobile station and the three antennas a, b and c are greatly different from one another, the change caused by distance becomes the predominant factor in the fluctuations in the reception level. As a result, in accordance with the position of the mobile station, the antennas by which the signals of the channels are to be transmitted/received are substantially determined. In this case, since the communication radio waves of other stations, which are transmitted/received by the associated antennas, are greatly attenuated as the distances further increase, as compared with the communication radio wave of the local station, it is difficult for those communication radio waves of other stations to interfere with the communication radio wave of the local station. That is, the communication radio waves of other stations which are transmitted/received by the same antenna are the predominant factor in the interference. In such a way, if the plurality of antennas are widely distributively arranged within the cover area of the base station, from the random nature of the positions of the mobile stations, the number of mobile stations for which the transmission/reception by individual antennas is predominant becomes equal to one another in terms of probabilities. That is, as compared with the case where the number of antennas is one, in the case where the number of antennas is three, the number of mobile stations for which transmission/reception by the same antenna is predominant is reduced to ⅓, and the number of communication radio waves of other stations other than the local station, which cause interference, is approximately reduced to ⅓. Thus, the interference is greatly reduced.

The effect is that the communication quality is improved remarkably on the transmission side (in the forward link to the base station) by reducing interference. That is, high quality communication in which the bit error rate is low in the forward link becomes possible.

Fifth Embodiment

Figure 10:
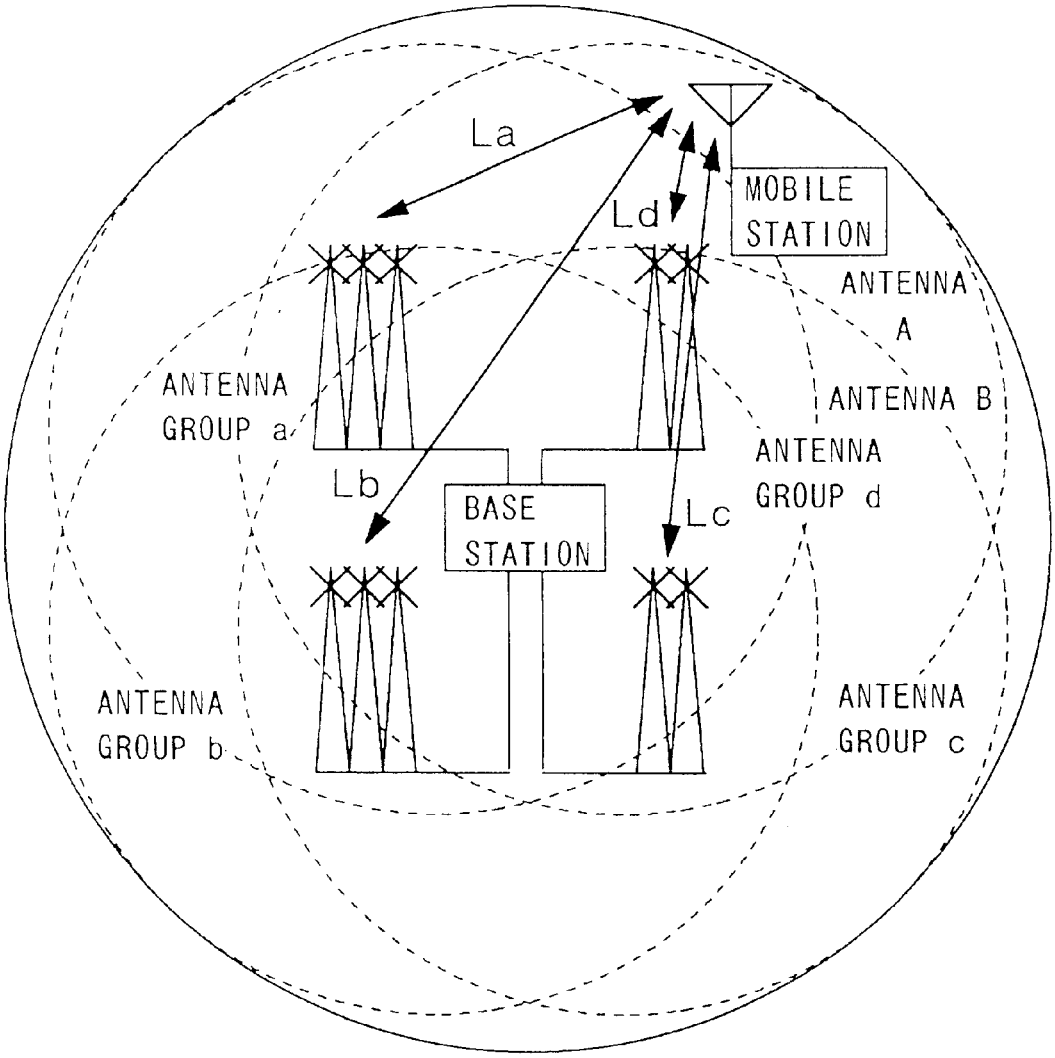
FIG. 10 is a schematic view showing an arrangement of antennas of a base station of a mobile telecommunication system according to a fifth embodiment of the present invention.

The configuration of a base station of a mobile telecommunication system according to the present embodiment is the same as that in the second embodiment. FIG. 10 shows an example of an antenna arrangement of the base station of the mobile telecommunication system in the present embodiment, and also shows an example in the case where ten antennas are employed. The ten antennas are divided into four antenna groups a, b, c and d. The antenna group a has three antennas, the antenna group b has three antennas, the antenna group c has two antennas, and the antenna group d has two antennas. Those antenna groups are arranged at four locations within the cover area of the base station. The antennas in each antenna group are arranged in the associated location so as to be separated enough to obtain independently fading transmission links. The distances among the antenna groups are sufficiently larger than those among the antennas in each antenna group.

In the case where the antennas are arranged in a manner as shown in FIG. 10, since the distances La, Lb, Lc and Ld between the mobile station and the antenna groups a, b, c and d are largely different from one another, the change caused by distance becomes the predominant factor in the difference in the reception levels among the antenna groups. Therefore, in accordance with the position of the mobile station, the antenna group by which the transmission/reception is to be performed is substantially determined. In this case, since the communication radio waves of other stations which are transmitted/received by the antennas of the antenna groups are largely attenuated as the distances further increase, as compared with the communication radio wave of the local station, it is difficult for those communication radio waves of other stations to interfere with the communication radio wave of the local station. That is, the cause of the interference is substantially limited to the communication radio waves of other stations which are transmitted/received by the same antenna group. In such a way, if the antenna groups are widely distributively arranged in the cover area of the base station, from the random nature of the positions of the mobile stations, the number of mobile stations for which transmission/reception by the individual antenna groups is predominant become equal to one another in terms of probabilities. That is, as compared with the case where the number of antenna groups is one, in the case where the number of antenna groups is four, the number of mobile stations for which the transmission/reception by the same antenna group is predominant is reduced to ¼, and the number of communication radio waves of other stations other than the local station, which cause interference, is approximately reduced to ¼. Thus, the interference is greatly reduced.

On the other hand, the distances between the mobile station and the individual antennas in the same antenna group are not largely different from one another. Since there is not a large difference in the environment such as the communication links, and the instantaneous change becomes the predominant factor in the fluctuations in the reception level, for the long term average, there is no difference in reception level between the antennas. Therefore, even if the reception level of antenna A has an instantaneous drop during communication with a mobile station for which the transmission/reception by the antenna group d for example becomes predominant, the possibility is high that a better reception level can be obtained by antenna B or C, and hence with an antenna of interest, good reception can be obtained. This also applied to the case where the reception level of antenna B or C drops. Thus, the possibility is small that the reception levels of all of the three antennas are poor. Therefore, if the antenna having the higher reception level is selected to perform the transmission/reception, communication at the a reception level can be always performed. In addition, by increasing the number of antennas, the possibility is reduced more and more that the reception levels of all of the antennas may drop, and hence fluctuation in the reception level after selection of the antenna becomes small.

The effect is that the communication quality is remarkably improved on the reception side (in the reverse link of the base station) by stabilizing the transmission/reception level. On the other hand, the communication quality is also remarkably improved on the transmission side (in the forward link of the base station) by reducing interference. That is, high quality communication in which the bit error rate is low in both the reverse link and the forward link becomes possible.

Sixth Embodiment

FIG. 11 shows the configuration of a base station of a mobile telecommunication system according to a sixth embodiment of the present invention, and also shows an example in which the base station includes two antennas and two channels a and b. In FIG. 11, reference numeral 101 designates a first antenna (an antenna A), reference numeral 201 designated a second antenna (an antenna B), reference numeral 102 designates a first transmission/reception switching switch for the first antenna 101, reference numeral 202 designates a second transmission/reception switching switch for the second antenna 201, reference numeral 103 designates a first radio receiving unit for the first antenna 101, and reference numeral 203 designates a second radio receiving unit for the second antenna 201. Reference numeral 105 designates a first despreading circuit for the first antenna 101, and reference numeral 205 designates a second despreading circuit for the second antenna 201. In this connection, each of the first and second despreading circuits 105 and 205 operates to subject received data to despreading using both spreading codes α and β. Reference numeral 307 designates a first estimation circuit which operates to estimate future values from past values of the correlation levels (the power levels of received signals), of the first channel a, which have been obtained by the despreading in the first and second despreading circuits 105 and 205 using the spreading code α, and reference numeral 407 designates a second estimation circuit which operates to estimate future values from past values of the correlation levels, of the second channel b, which have been obtained by the despreading in the first and second despreading circuits 105 and 205 using the spreading code β. Reference numeral 301 designates a first comparison circuit for the first channel a which operates to compare the estimated values of the correlation levels, which have been obtained from the first estimation circuit 307, between the first and second antennas 101 and 201, and reference numeral 401 designates a second comparison circuit for the second channel b which operates to compare the estimated values of the correlation levels, which have been obtained from the second estimation circuit 407, between the first and second antennas 101 and 201. Reference numeral 302 designates a first composition circuit which operates to compose the received signals of the first channel a which have been obtained by the despreading in the first and second despreading circuits 105 and 205 using the spreading code α, reference numeral 402 designates a second composition circuit which operates to compose the received signals of the second channel b which have been obtained by the despreading in the first and second despreading circuits 105 and 205 using the spreading code β, reference numeral 303 designates a first decode circuit for the first channel a which operates to decode the composite signal which has been obtained by composing the received signals in the first composition circuit 302, and reference numeral 403 designates a second decode circuit for the channel b which operates to decode the composite signal which has been obtained by composing the received signals in the second composition circuit 402. In addition, reference numeral 502 designates a comparison circuits controlling circuit which operates to be responsive to first and second transmission antenna selection signals 306 and 406, which have been output from the first and second comparison circuits 301 and 401, respectively, to control the operations of the first and second comparison circuits 301 and 401.

Reference numeral 304 designates a first spreading circuit which operates to spread transmission data of the first channel a using the spreading code α, reference numeral 404 designates a second spreading circuit which operates to spread transmission data of the second channel b using the spreading code β, reference numeral 305 designates a first transmission antenna selecting circuit for the first channel a which operates to select from which antenna the transmission signal, which has been obtained by spreading in the first spreading circuit 304, is to be transmitted, and reference numeral 405 designates a second transmission antenna selecting circuit for the second channel b which operates to determine from which antenna the transmission signal, which has been obtained by spreading in the second spreading circuit 404, is to be transmitted. Reference numeral 106 designates a first multiplexing circuit which operates to multiplex the spread transmission signals with respect to the first antenna 101, reference numeral 206 designates a second multiplexing circuit which operates to multiplex the spread transmission signals with respect to the second antenna 201, and reference numeral 104 designates a first radio transmission unit for the first antenna 101 which has a first quadrature modulator 107 and a first linear amplifier 108. Reference numeral 204 designates a second radio transmission unit for the second antenna 201 which has a second quadrature modulator 207 and a second linear amplifier 208. In addition, reference numeral 501 designates a transmission/reception switching timing signal which is used to operate the first and second transmission/reception switching switches 102 and 202.

Next, the operation of the abovementioned sixth embodiment will be described.

The received signals which have been received by the first and second antennas 101 and 201, respectively, are subjected to first order demodulation in the first and second radio receiving units 103 and 203 after passing through the first and second transmission/reception switching switches 102 and 202. Then, after down-conversion and detection, the correlation of the first and second channels a and b are detected by each of the first and second despreading circuits 105 and 205. With respect to the correlation detection results which have been obtained from the two antennas 101 and 201 independently of each other, the frame mean powers of the correlation levels (the power levels of the received signals) are calculated for every channel in each of the first and second comparison circuits 307 and 407. On the basis of those results, the transmission link states (the transfer functions of the transmission links) of the first and second antennas 101 and 201 are obtained to estimate future values from the past values. The estimated future values are compared with each other by each of the first and second comparison circuits 301 and 401, and then it is determined, due to an instruction issued from the comparison circuits controlling circuit 502, from which of the first and second antennas 101 and 201 the signal of each channel is to be transmitted outwardly at the next transmission timing. Then first and second transmission antenna selection signals 306 and 406 are respectively output. The first and second transmission antenna selection signals 306 and 406 are fed back to the comparison circuits controlling circuit 502, which is responsive to the first and second transmission antenna selection signals 306 and 406 to determine whether or not a transmission antenna is to be selected over again and to issue instructions to both of the first and second comparison circuits 301 and 401. The received signals which have been passed through the first and second comparison circuits 301 and 401, respectively, are composed by the first and second composition circuits 302 and 402 to be decoded in the first and second decode circuits 303 and 403 of the respective channels, thereby obtaining the reception data of the individual channels.

On the other hand, the transmission data of the first channel a and the transmission data of the second channel b (the signals after digital modulation) are respectively subjected to band spreading in the first and second spreading circuits 304 and 404 using the spreading codes α and β, which are assigned to the respective channels, and then are multiplexed with respect to the transmission antennas in the first and second multiplexing circuits 106 and 206 through the first and second transmission antenna selecting circuits 305 and 405, which are switched to each other by the first and second transmission antenna selection signals 306 and 406. The multiplexed signals are respectively up-converted in the first and second radio transmission units 104 and 204, and then are respectively transmitted outwardly from the first and second antennas 101 and 201 through the first and second transmission/reception switching switches 102 and 202, which are switched by the transmission/reception switching timing signal 501.

The operation for switching the antennas in the CDMA/TDD system of the present embodiment is the same as that shown in FIG. 7. In the case where at time t0, the levels of the received signals of the individual channels (the averages or the like of the levels of the received signals for one frame) have the relationship, as shown in FIG. 7, with respect to the antennas A and B, and are estimated, at the next time t1, as shown in FIG. 7, when transmission is performed, the individual channels select the antennas each having the higher reception level independently of one another to transmit therefrom outwardly the associated signals. This algorithm is shown in FIG. 12.

Figure 12:
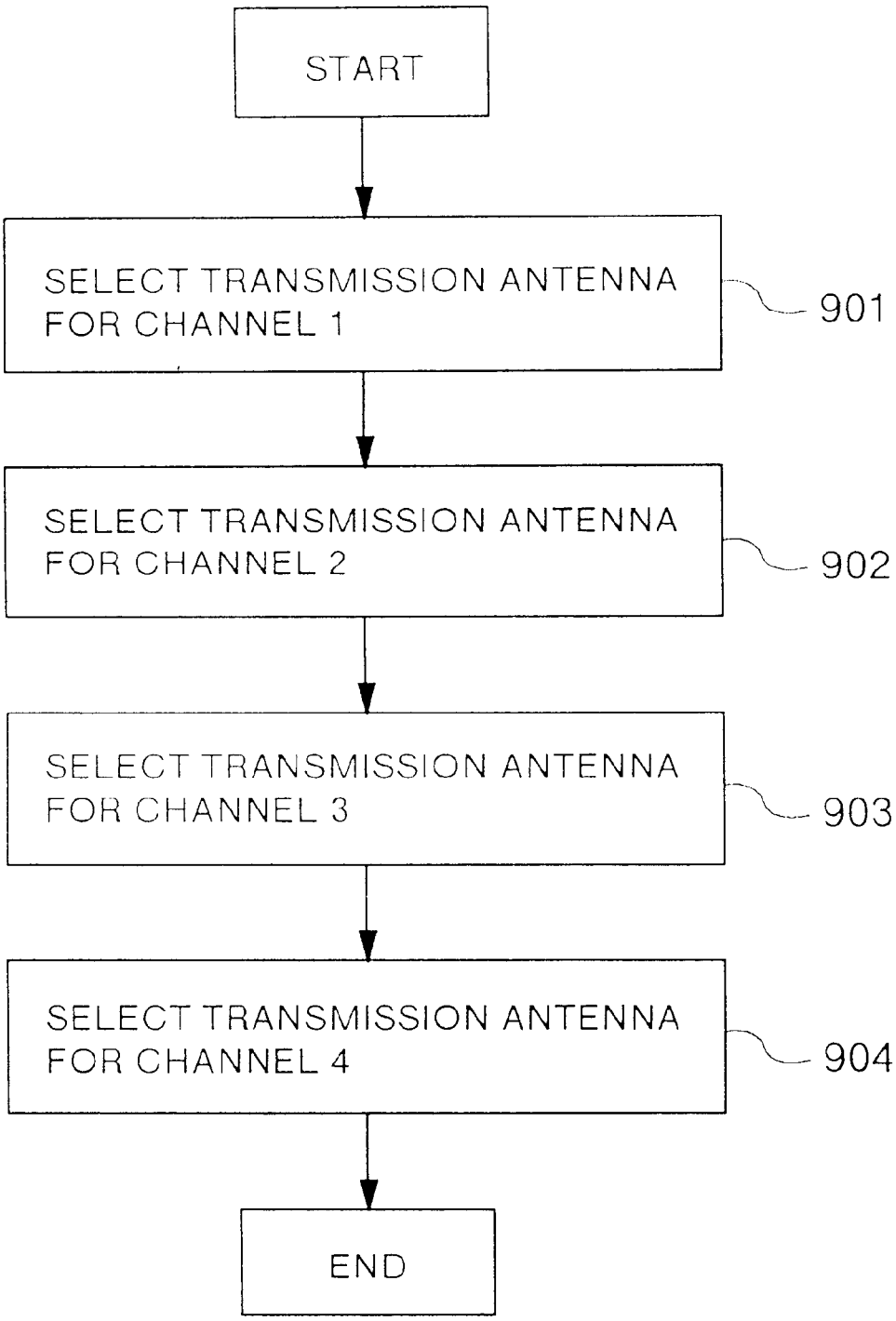
FIG. 12 is a flow chart showing an algorithm for controlling a comparison circuit in the sixth embodiment.

In FIG. 12, firstly, the antenna from which the signal of channel 1 is to be transmitted outwardly is selected (Step 901), and next the antenna from which the signal of channel 2 is to be transmitted outwardly is selected (Step 902), and next the antenna from which the signal of channel 3 is to be transmitted outwardly is selected (Step 903), and finally, the antenna from which the signal of channel 4 is to be transmitted outwardly is selected (Step 904). Those antennas are selected perfectly independently of one another, and from which antennas the signals of other channels are to be transmitted outwardly does not exert an influence on the selection of the transmission antenna of each channel. In FIG. 7, reference symbols of the selected antennas are shown. In this connection, it is shown at time t1 that each of the channels 1 and 3 selects the antenna A and each of the channels 2 and 4 selects the antenna B, and then after the signals of channel 1 and the signal of channel 3 have been multiplexed, the resultant signal is transmitted outwardly from the antenna A, and also after the signal of channel 2 and the signal of channel 4 have been multiplexed, the resultant signal is transmitted outwardly from the antenna B. At time t3 as well, on the basis of the reception levels at time t2 and the reception levels prior thereto, the transmission link states at time t3 are estimated, and a transmission antenna is selected for every channel and multiplexing is performed with respect to every antenna, and then the resultant signals are transmitted outwardly from the associated antennas. At time t5 as well, similarly, the abovementioned processings will be executed.

From the random nature of the positions of the mobile stations and the independency of the fading of the transmission links associated with the antennas, even by such a simple transmission antennas selecting algorithm, the selected transmission antennas for the individual channels are not concentrated, in terms of probabilities, on a subset of the antennas, but are distributed to the individual antennas. That is, even without complicated control, the transmissions are distributed to the individual antennas in a manner that reduces the number of signals which are multiplexed in one antenna, and as a result the performance which is required for the first and second quadrature modulators 107 and 207 can be reduced, along with the performance which is required for the first and second linear amplifiers 108 and 208 of the first and second radio transmission units 104 and 204.

Seventh Embodiment

The configuration of a base station of a mobile telecommunication system according to the present embodiment is the same as that in the sixth embodiment. FIG. 13 shows an example in which the CDMA/TDD system of the present embodiment, the base station having two antennas A and B, switches the transmission antenna for every channel in accordance with the levels of the received signals. The transmission/reception frames are shown in FIG. 13, and also an example in the case where four channels are provided. In this connection, similarly to FIG. 5, reference symbol TX represents transmission and reference symbol RX represents reception, and it is assumed that the mobile terminals PS1 to PS4 (referring to FIG. 1) perform their respective communications using the channels 1 to 4. In the case where at time t0, the levels of the received signals of the channels (the averages or the like of the levels of the received signals for one frame) have the relationship, as shown in FIG. 13, with respect to the antennas A and B, and then the levels at next time t1 are estimated as shown in FIG. 13, when transmission is performed at next time t1, the individual channels select respective antennas each having the higher estimated value of the reception level independently of one another to transmit therefrom outwardly the associated signals. This algorithm is shown in FIG. 14.

Figure 14:
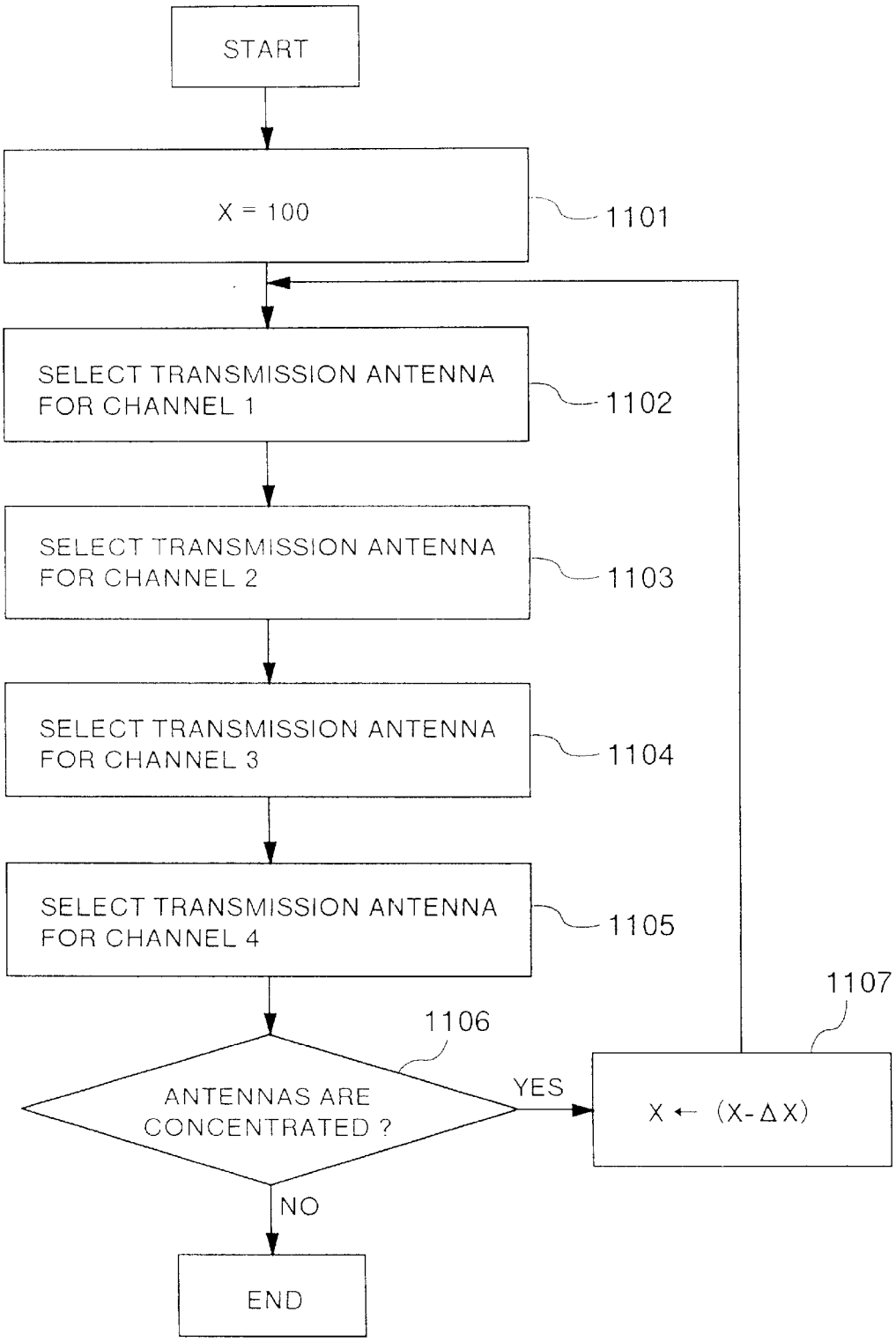
FIG. 14 is a flow chart showing an algorithm for controlling a comparison circuit in the seventh embodiment.

In FIG. 14, firstly, the relation of X=100 is set. Then, out of the antenna having the highest reception level and the antenna having the second highest reception level, the antenna having the highest reception level is selected at a probability of X%, and the antenna having the second highest reception level is selected at a probability of (100−X)% (Step 1101). First, the antenna from which the signal of channel 1 is to be transmitted outwardly is selected (Step 1102), and next the antenna from which the signal of channel 2 is to be transmitted outwardly is selected (Step 1103), and next the antenna from which the signal of channel 3 is to be transmitted outwardly is selected (Step 1104), and finally, the antenna from which the signal of channel 4 is to be transmitted outwardly is selected (Step 1105). Then, it is checked whether or not the antennas from which the signals of the individual channels are to be transmitted outwardly are concentrated on a subset of the antennas (e.g., one antenna) (Step 1106). Then, if not, the process of selecting the transmission antennas is completed. On the other hand, if so, the value of X is gradually decreased (Step 1107) and the transmission antennas for the individual channels are selected over again in accordance with the above-mentioned algorithm. In FIG. 13, reference symbols of the selected antennas are shown. In addition, it is shown at time t1 that each of the channels 1 and 3 selects the antenna and each of the channels 2 and 4 selects the antenna B, and that after the signal of channel 1 and the signal of channel 3 have been multiplexed, the resultant signal is transmitted outwardly from the antenna A, and also after the signal of channel 2 and the signal of channel 4 have been multiplexed, the resultant signal is transmitted outwardly from the antenna B. Then, it is shown at time t3 that each of the channels 1, 2 and 3 selects the antenna A and only channel 4 selects the antenna B, and that after the signal of channel 1, the signal of channel 2 and the signal of channel 3 have been multiplexed, the resultant signal is transmitted outwardly from antenna A, and also the signal of channel 4 is transmitted outwardly from antenna B (after the multiplexing). Then, at time t5, since for all of the channels, antenna A has a larger estimated value than antenna B, in the first selection at a probability of X=100, all of the channels select the antenna A, and hence the channels concentrate on one antenna. As a result of decreasing slightly the value of X to perform the selection over again, it is shown that channel 4 selects the antenna B.

From the random nature of the positions of the mobile stations and the independency of the fading of the transmission links associated with the antennas, even in the selection at a probability of X=100%, though small in terms of probabilities, the selected transmission antennas for the associated channels may concentrate on one of the antennas in some cases. In such cases, there is provided the effect that even if the channel(s) selecting the antenna(s), in which the reception level is not maximum, may be more or less present, by selecting the antennas over again, the transmission antennas are distributed to the individual antennas so that the number of channels the signals of which are multiplexed can be reduced, and also the performance can be reduced which is required for the first and second quadrature modulators 107 and 207 and the first and second linear amplifiers 108 and 208 of the first and second radio transmission units 104 and 204 in the base station.

Eighth Embodiment

The configuration of a base station of a mobile telecommunication system according to the present embodiment is the same as that in the sixth embodiment. But, an example is considered in which the total number of accommodation channels within the cover area of the base station is four (L=4). As for the performance of the first and second quadrature modulators 107 and 207 and the first and second linear amplifiers 108 and 208 of the first and second radio transmission units 104 and 204, the radio transmission unit for one antenna has a transmission capability up to two channels (M=2). FIG. 15 is an example in which the CDMA/TDD system, the base station having two antennas A and B, switches the transmission antenna for every channel in accordance with the levels of the received signals. The transmission/reception frames, and also an example in which four channels are provided. In this connection, similarly to FIG. 5, reference symbol TX represents transmission and reference symbol RX represents reception, and also it is assumed that the mobile terminals PS1 to PS4 (referring to FIG. 1) perform their respective communications using channels 1 to 4. In the case where at time t0, the levels of the received signals of the channels (the averages or the like of the levels of the received signals for one frame) have the relationship, as shown in FIG. 15, with respect to the antennas A and B, and then are estimated, when the transmission is performed at the next time t1, the individual channels select the respective antennas each having the higher estimated value of the reception level independently of one another to transmit therefrom outwardly the associated signals. This algorithm is shown in FIG. 16.

Figure 16:
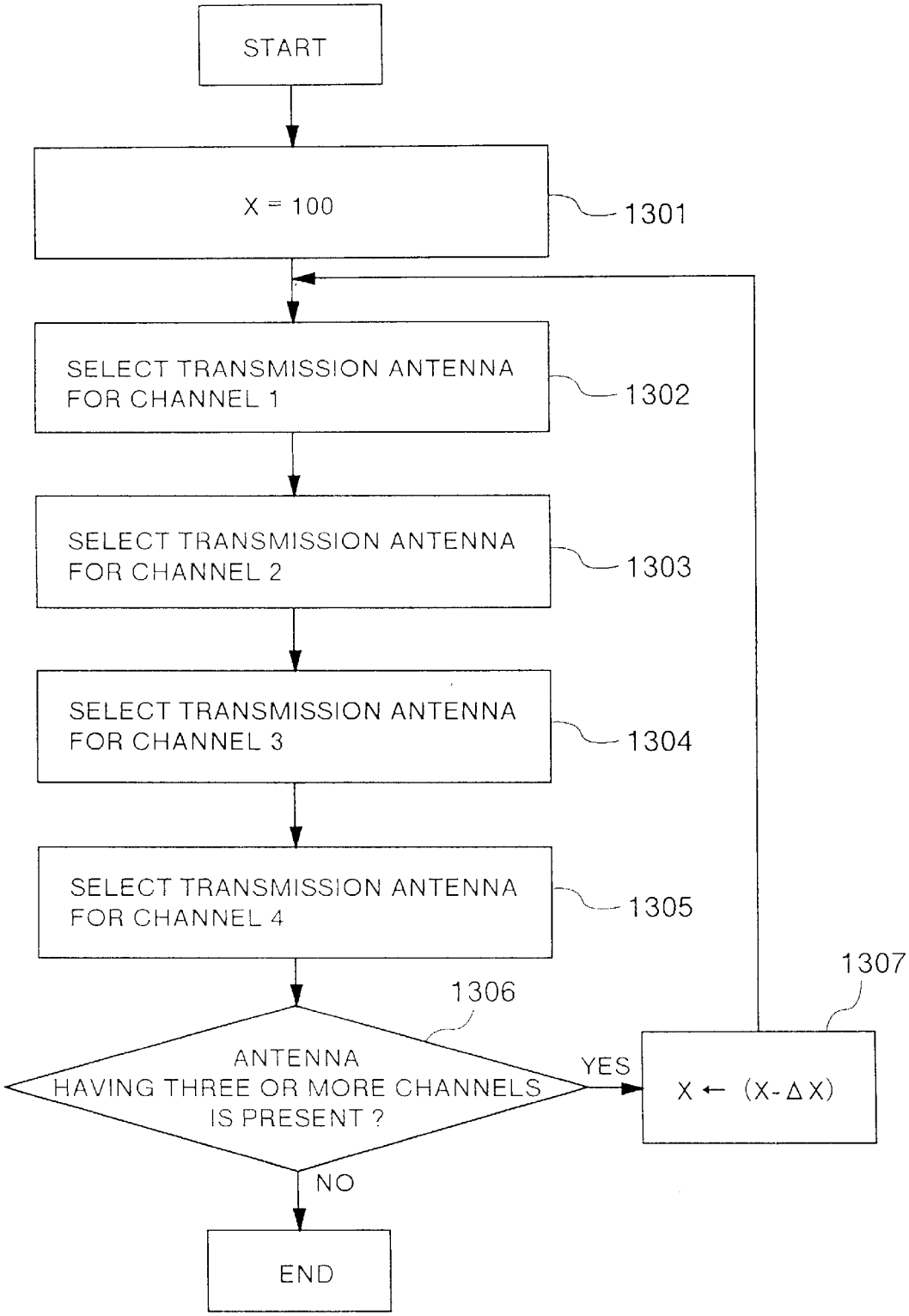
FIG. 16 is a flow chart showing an algorithm for controlling a comparison circuit in the eighth embodiment.

In FIG. 16, firstly, the relation of X=100 is set. Then, out of the antenna having the highest reception level and the antenna having the second highest reception level, the antenna having the highest reception level is selected at a probability of X%, and the antenna having the second highest reception level is selected at a probability of (100–X)% (Step-1301). First, the antenna from which the signal of channel 1 is to be transmitted outwardly is selected (Step 1302), and next the antenna from which the signal of channel 2 is to be transmitted outwardly is selected (Step 1303), and next the antenna from which the signal of channel 3 is to be transmitted outwardly is selected (Step 1304), and finally, the antenna from which the signal of channel 4 is to be transmitted outwardly is selected (Step 1305). Then, it is checked whether or not an antenna which has been selected as the transmission antenna by three or more channels is present (Step 1306). If not, the process of selecting the transmission antennas is completed. On the other hand, if so, the value of X is gradually decreased (Step 1307), and then the transmission antennas for the individual channels are selected over again until such an antenna becomes absent. In FIG. 13, reference symbols for the selected antennas are shown. In addition, it is shown at time t1 that each of the channels 1 and 3 selects the antenna A and each of the channels 2 and 4 selects the antenna B, and that after the signal of channel 1 and the signal of channel 3 have been multiplexed, the resultant signal is transmitted outwardly from the antenna A, and also after the signal of channel 2 and the signal of channel 4 have been multiplexed, the resultant signal is transmitted outwardly from the antenna B. Since at time t3, for the channels 1, 2 and 3, antenna A has a larger estimated value than that of antenna B, and for channel 4, antenna B has a larger estimated value than antenna A, in the first selection at a probability of X=100, each of the channels 1, 2 and 3 selects the antenna B, and also channel 4 selects the antenna B. Thus, three channels concentrate on the antenna A. As a result of decreasing slightly the value of X before performing the selection over again, it is shown that the channel 2 selects the antenna B. Then, at time t5, since for all of the channels, the antenna A has a larger estimated value than antenna B, in the first selection at a probability of X=100, all of the channels select the antenna A, and hence the channels concentrate on one antenna. As a result of decreasing slightly the value of X to before performing the selection over again, it is shown that the channels 3 and 4 select the antenna B.

From the random nature of the positions of the mobile stations and the independency of the fading of the transmission links associated with the antennas, even in the first selection at a probability of X=100%, the selected transmission antennas for the associated channels are not concentrated, in terms of probabilities, on one of the antennas, but are distributed to the individual antennas. But, though small in terms of probabilities, the selected transmission antennas for the associated channels may be concentrated on one of the antennas in some cases. In such cases, even if the channels may be more or less present which select the antenna(s) in which the reception level is not maximum, when the antennas are selected over again so that the transmission antennas are distributed to the individual antennas, the system can suppress interference more effectively. In addition, even in the case where the performance of the first or second quadrature modulator 107 and 207 and the first or second linear amplifiers 108 and 208 of the first or second radio transmission unit 108 or 208 for one antenna in the base station is inferior to the mobile station accommodation capability of the whole base station, by distributing the transmission antennas to the individual antennas to decrease the number of channels the signals of which are multiplexed, the system can be readily configured.

We claim:

1. A mobile telecommunication system for performing communication by utilizing a CDMA/TDD system, said mobile telecommunication [System] *system* including a base station which comprises:

a plurality of antennas;

despreading means for subjecting signals, which are received by said antennas, to despreading for a plurality of channels each of which is assigned to a corresponding code, the received signals being despread with each code assigned for each channel;

comparison circuits each of which serve to compare correlation levels with respect to the code assigned for each channel, which correlation levels are obtained by said despreading means, with each other with respect to said antennas and to determine from which antenna a signal is to be transmitted outwardly;

spreading means for spreading transmission data with each code assigned for each channel transmission antenna selecting means for selecting, on the basis of an output signal from each of said comparison circuits, for every channel, an antenna from which a transmission signal, which is obtained by the spreading in said spreading means, is to be transmitted outwardly; and multiplexing means for multiplexing the transmission signals of the associated channels, which are obtained by the spreading and which are selected for transmission by the same antenna, for every antenna.

2. A system according to claim 1, wherein said base station further comprises means for composing the correlation levels of said antennas with the code assigned for each channel, which correlation levels are obtained by the despreading.

3. A system according to claim 1, wherein said base station further comprises means for estimating, from changes in past values of the correlation levels of said antennas with the code assigned for each channel, which correlation levels are obtained by the despreading, future values of the correlation levels with the code.

4. A system according to claim 1, wherein all of said plurality of antennas of said base station are adjacently arranged in a central portion of a cover area of said base station.

5. A system according to claim 1, wherein said plurality of antennas of said base station are distributively arranged in a plurality of locations within a cover area of said base station.

6. A system according to claim 1, wherein said plurality of antennas of said base station are divided into a plurality of antenna groups, and the plurality of antennas in each of said antenna groups are adjacently arranged, and also said antenna groups are distributively arranged in a plurality of locations within a cover area of said base station.

7. A system according to claim 1, wherein in said transmission antenna selecting means, antennas are selected for individual channels independently of the selection for other channels.

8. A system according to claim 1, wherein said transmission antenna selecting means adjusts the selection of antennas for the channels so as to avoid selecting only a subset of antennas out of all of said antennas.

9. A system according to claim 1, wherein:

said multiplexing means has a multiplexing capability corresponding to a number of channels which does not exceed a constant (M) that is smaller than the total number of channels (L) within a cover area of said base station;

said base station further comprises radio transmission/reception means provided for every antenna which has an amplification capability to accommodate the number of channels which does not exceed said constant (M); and said transmission antenna selecting means selects antennas for the channels so that the number of channels selected for any one of the antennas *does* not [to] exceed said constant (M).

10. A system according to claim 1, wherein said base station further comprises transmission/reception switching means for switching transmission/reception the antennas.

11. A mobile telecommunication system for performing communication by utilizing a CDMA/TDD system adopting a direct spread method, said mobile telecommunication system including a base station which comprises:

a plurality of antennas radio transmission/reception means provided for every antenna;

despreading means for subjecting received signals, which are received by said antennas, to despreading for each of a plurality of channels;

comparison means for comparing correlation levels, which are obtained by the despreading, with respect to said antennas, for every channel decode means for decoding the received signals;

spreading means for spreading transmission data for every channel in transmission;

transmission antenna selecting means for selecting an antenna for every channel from which a transmission signal, which is obtained by the spreading in said spreading means, is to be transmitted outwardly and multiplexing means for multiplexing the transmission signals of the associated channels, which are obtained by the spreading, for every antenna.

12. A system according to claim 11, wherein said base station further comprises means for composing the correlation levels of said antennas with the code assigned for each channel, which correlation levels are obtained by the despreading.

13. A system according to claim 11, wherein said base station further comprises means for estimating, from changes in past values of the correlation levels of said antennas with a code assigned for each channel, which correlation levels are obtained by the despreading, future values of the correlation levels with the code.

14. A system according to claim 11, wherein all of said plurality of antennas of said base station are adjacently arranged in a central portion of a cover area of said base station.

15. A system according to claim 11, wherein said plurality of antennas of said base station are distributively arranged in a plurality of locations within a cover area of said base station.

16. A system according to claim 11, wherein said plurality of antennas of said base station are divided into a plurality of antenna groups, and the plurality of antennas in each of said antenna groups are adjacently arranged, and also said antenna groups are distributively arranged in a plurality of locations within a cover area of said base station.

17. A system according to claim 11, wherein in said transmission antenna selecting means, antennas are selected for individual channels independently of the selection for other channels.

18. A system according to claim 11, wherein said transmission antenna selecting means adjusts the selection of antennas for the channels so as to avoid selecting only a subset of antennas out of all of said antennas.

19. A system according to claim 11, wherein:

said multiplexing means has a multiplexing capability corresponding to a number of channels which does not exceed a constant (M) that is smaller than the total number of channels (L) within a cover area of said base station;

said radio transmission/reception means has an amplification capability to accommodate the number of channels which does not exceed said constant (M); and said transmission antenna selecting means selects antennas for the channels so that the number of channels selected for any one of the antennas not to exceed said constant (M).

20. A system according to claim 11, wherein said base station further comprises transmission/reception switching means for switching the antennas.

21. A mobile telecommunication system for performing communication over a plurality of channels by utilizing a CDMA/TDD system, each channel having a spreading code assigned to it, said mobile telecommunication system including a base station which comprises:

a plurality of antenna means for receiving and radiating signals;

despreading means for despreading signals received by each of the antenna means using the spreading codes assigned to all of the channels, to thereby generate for every antenna means a set of despread signals for all of the channels;

comparison means for receiving the sets of despread signals and ascertaining the power level of the received signal for each channel at each of the antenna means;

spreading means for spreading transmission data for each channel with the spreading code assigned to that channel, to thereby generate a plurality spread data for all of the channels;

means, receiving signals from the comparison means, for selecting one of the antenna means from among the plurality of antenna means to radiate the spread data for each channel; and multiplexing means for multiplexing spread data that have been selected for radiation by the same antenna means.

22. A system according to claim 21, further comprising means, responsive to despread signals received via each of the antenna means, for composing the despread signals of each channel.

23. A system according to claim 21, wherein the means for selecting comprises means for estimating, from past values of the power levels of the received signals for each channel at each of the antenna means, future values of the power levels.

24. A system according to claim 21, wherein all of the antenna means are located at a central portion of a cover area of the base station.

25. A system according to claim 21, wherein the antenna means are distributed in a plurality of locations within a cover area of the base station.

26. A system according to claim 25, wherein at least one of the antenna means comprises a plurality of antennas arranged adjacent one another.

27. A system according to claim 21, wherein the means for selecting comprises means for selecting an antenna means to radiate the spread data for each channel independently of the selection of antenna means for other channels.

28. A system according to claim 21, wherein the means for selecting comprises means for limiting the number of channels whose spread data has been selected for radiating by the same antenna means.

*29. A CDMA/TDD (Code Division Multiple Access/Time Division Duplex) base station, comprising:*

*a plurality of antennas;*

*despreading means for subjecting signals received by each of said antennas to despreading for each of a plurality of channels;*

*comparison means for comparing correlation levels for each channel with respect to each antenna, which correlation levels are obtained by said despreading means, to determine which antennas have received which channels best;*

*transmission antenna selecting means for selecting, on the basis of output signals from said comparison means, for every channel, one of said antennas from which a transmission signal is to be transmitted outwardly; and*

*multiplexing means for multiplexing the transmission signals of associated channels which are selected for transmission by the same antenna, for every antenna.*

*30. A CDMA/TDD base station according to claim 29, further comprising means for estimating, from changes in past values of the correlation levels, future values of the correlation levels with the code.*

*31. A CDMA/TDD base station according to claim 29, wherein all of said plurality of antennas of said base station are adjacently arranged in a central portion of a cover area of said base station.*

*32. A CDMA/TDD base station according to claim 29, wherein said plurality of antennas of said base station are distributively arranged in a plurality of locations within a cover area of said base station.*

*33. A CDMA/TDD base station according to claim 29, wherein said plurality of antennas of said base station are divided into a plurality of antenna groups, each antenna group having a plurality of antennas, wherein the plurality of antennas in each of said antenna groups are adjacently arranged, and wherein said antenna groups are distributively arranged at a plurality of locations within a cover area of said base station.*

*34. A CDMA/TDD base station according to claim 29, wherein in said transmission antenna selecting means, antennas are selected for individual channels independently of the selection for other channels.*

*35. A CDMA/TDD base station according to claim 29, wherein said transmission antenna selecting means adjusts the selection of antennas for the channel so as to avoid selecting only a subset of antennas out of all of said antennas.*

*36. A CDMA/TDD base station according to claim 29, wherein:*

*said multiplexing means has a multiplexing capability corresponding to a number of channels which does not exceed a constant (M) that is smaller than the total number of channels (L) within a cover area of said base station;*

*said base station further comprises radio transmission/reception means provided for every antenna which has an amplification capability to accommodate the number of channels which does not exceed said constant (M); and*

*said transmission antenna selecting means selects antennas for the channels so that the number of channels selected for any one of the antennas not to exceed said constant (M).*

*37. A CDMA/TDD base station according to claim 29, in combination with a CDMA/TDD mobile station that communicates with said base station.*

*38. A CDMA/TDD mobile communication method, comprising the steps of:*

*(a) subjecting signals received by each of a plurality of antennas to despreading for each of a plurality of channels;*

*(b) comparing correlation levels for each channel with respect to each antenna, which correlation levels are obtained by said despreading, to determine which antennas have received which channels best; and*

*(c) selecting, on the basis of said comparing step, for every channel, one of said antennas from which a transmission signal is to be transmitted outwardly.*

*39. A method according to claim 38, further comprising the step of multiplexing transmission signals that were selected in step (c) for transmission by the same antenna.*

*40. A method according to claim 38, wherein step (c) comprises estimating, from changes in past values of the correlation levels, future values of the correlation levels with the code.*

*41. A method according to claim 38, wherein step (c) comprises adjusting the selection of antennas for the channels so as to avoid selecting only a subset of antennas out of all of said antennas.*

*42. A method according to claim 38, wherein step (c) comprises adjusting the selection of antennas for the channels so as to avoid selecting the same antenna for more than a predetermined number of channels.*

*43. A CDMA/TDD base station for communication with mobile stations over a plurality of channels, each channel having a code assigned to it, comprising:*

*a plurality of antennas;*

*a plurality of receiving units, each receiving unit corresponding to one of the antennas and receiving a signal via the corresponding antenna during a sequence of reception time slots;*

*means for despreading the signal received by each receiving unit using the codes assigned to all of the channels to thereby provide a set of despread signals corresponding to each antenna;*

*a plurality of transmission units, each transmission unit corresponding to one of the antennas;*

*means for spreading transmission data for each of the channels; and*

*means, responsive to the sets of despread signals, for selectively distributing the spread transmission data to the transmission units for transmission via the corresponding antennas during transmission time slots that are interspersed with the reception time slot.*

*44. A CDMA/TDD base station according to claim 43, in combination with a CDMA/TDD mobile station that communicates with said base station.*

* * * * *